United States Patent
Erhart et al.

(10) Patent No.: US 12,208,746 B2
(45) Date of Patent: *Jan. 28, 2025

(54) VEHICLE DISPLAY SYSTEM AND VEHICLE DISPLAY RETENTION SYSTEM

(71) Applicant: Motherson Innovations Company Limited, London (GB)

(72) Inventors: Volker Erhart, Stuttgart (DE); Arne Schmierer, Stuttgart (DE); Csaba Szilágyi, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 24 days.

This patent is subject to a terminal disclaimer.

(21) Appl. No.: 18/004,519

(22) PCT Filed: Aug. 16, 2021

(86) PCT No.: PCT/EP2021/072717
§ 371 (c)(1),
(2) Date: Jan. 6, 2023

(87) PCT Pub. No.: WO2022/034240
PCT Pub. Date: Feb. 17, 2022

(65) Prior Publication Data
US 2023/0249630 A1    Aug. 10, 2023

Related U.S. Application Data

(60) Provisional application No. 63/065,627, filed on Aug. 14, 2020, provisional application No. 63/065,606, filed on Aug. 14, 2020.

(30) Foreign Application Priority Data

Nov. 20, 2020   (DE) ...................... 10 2020 130 777.2

(51) Int. Cl.
*B60R 11/02* (2006.01)
*B60N 3/02* (2006.01)
(Continued)

(52) U.S. Cl.
CPC ...... *B60R 11/0235* (2013.01); *B60R 16/0215* (2013.01); *H05K 5/0247* (2013.01);
(Continued)

(58) Field of Classification Search
CPC ............. B60R 11/0235; B60R 16/0215; B60R 2011/0022; H05K 5/0247; H05K 7/20963; H05K 9/0007; B60N 3/026
See application file for complete search history.

(56) References Cited

U.S. PATENT DOCUMENTS 5,305,381 A * 4/1994 Wang .................. B60R 11/0241
                                                        379/426
5,647,607 A * 7/1997 Bolieau ................. B60R 21/216
                                                        280/728.2
(Continued)

FOREIGN PATENT DOCUMENTS

CN          205951822          2/2017

OTHER PUBLICATIONS

Moveland grab handle set for Jeeps sold on amazon dated Apr. 3, 2017, https://www.amazon.com/moveland-Handle-Wrangler-1987-2018-Accessories/dp/B06Y265T7R (Year: 2017).*
(Continued)

*Primary Examiner* — Eret C McNichols
*Assistant Examiner* — Ding Y Tan
(74) *Attorney, Agent, or Firm* — Jones Day

(57) ABSTRACT

The present disclosure refers to a vehicle display retention system, comprising a display unit affixed to a display frame and connected to a grab bar, and an intermediate adapter coupled to the grab bar, characterized in that the interme-
(Continued)

diate adapter comprises a mounting arm for attachment to a vehicle at a first mounting member, a retention strap coupled to the mounting arm and the vehicle at the first mounting member, and an attachment component coupled to the intermediate adapter.

28 Claims, 33 Drawing Sheets

(51) Int. Cl.
- *B60R 11/00* (2006.01)
- *B60R 16/02* (2006.01)
- *H05K 5/02* (2006.01)
- *H05K 7/20* (2006.01)
- *H05K 9/00* (2006.01)

(52) U.S. Cl.
CPC ....... *H05K 7/20963* (2013.01); *H05K 9/0007* (2013.01); *B60N 3/026* (2013.01); *B60R 2011/0022* (2013.01)

(56) References Cited

U.S. PATENT DOCUMENTS

| | | | |
|---|---|---|---|
| 6,158,793 A * | 12/2000 | Castro | B60R 11/02 224/548 |
| 9,358,929 B1 * | 6/2016 | Huebner | B60R 11/02 |
| 2001/0011664 A1 * | 8/2001 | Meritt | B60R 11/02 224/929 |
| 2005/0252053 A1 * | 11/2005 | Pena | G09F 21/042 40/591 |
| 2009/0212189 A1 * | 8/2009 | Carnevali | B25B 5/02 248/346.04 |
| 2013/0187369 A1 * | 7/2013 | Hock | B60R 21/235 112/475.08 |
| 2013/0256478 A1 * | 10/2013 | Reda | F16M 13/022 224/275 |
| 2016/0062117 A1 | 3/2016 | Imaska et al. | |
| 2016/0068095 A1 * | 3/2016 | Angara | B60R 13/105 224/572 |
| 2019/0061622 A1 * | 2/2019 | Hoyda | H04N 7/181 |
| 2019/0263327 A1 * | 8/2019 | Sautter | B60R 11/0235 |

OTHER PUBLICATIONS

Glenair microfilament braided ground strap datasheet, dated 2018 https://www.glenair.com/ground-straps/index.htm (Year: 2018).*

Uniform Federal Accessibility Standards https://www.access-board.gov/aba/ufas.html in 4.26.3 Structural Strength, publish in the Federal Register on Aug. 7, 1984 (49 FR 31528) (Year: 1984).*

International Search Report and Written Opinion dated Mar. 16, 2022 of International application No. PCT/EP2021/072717.

* cited by examiner

VEHICLE DISPLAY SYSTEM AND VEHICLE DISPLAY RETENTION SYSTEM

CROSS-REFERENCE TO RELATED APPLICATIONS

This application is a National-Stage Entry of International Patent Application No. PCT/EP2021/072717 filed on Aug. 16, 2021, which claims to benefit of priority to each of (i) U.S. Provisional Patent Application No. 63/065,627 filed on Aug. 14, 2020, (ii) U.S. Provisional Patent Application No. 63/065,606 filed on Aug. 14, 2020, and (iii) German Patent Application No. DE 10 2020 130 777.2 filed on Nov. 20, 2020, each of which is incorporated by reference in its entirety for all purposes.

BACKGROUND

1. Field

The present disclosure relates to a vehicle display system and a vehicle display retention system, to a method to assemble said system(s) and to a vehicle comprising said system(s).

2. Related Art

Vehicles are increasingly moving toward implementation of cameras and electronic display systems to provide additional safety and security systems. The placement of such an electronic display system needs to be visible to the driver in order to access the information provided and be retained in the event of an impact scenario. Current display systems are not efficient at retaining the respective position of the display system and do not account for differences in driver eye height. Additionally, current display systems require specific tooling to facilitate the adjustment of the display system. This results in the user requiring additional time and difficulty to adjust the display system. Moreover, typically electronic display systems are added to the windshield and headliner of the vehicle and constitute a retention system utilizing a plastic wire connecting the electronic display system to the headliner or windshield. The intention of this wire is to retain the electronic display system during impact scenarios. However, these configurations lack stability and are not robust for larger and heavier electronic display systems.

SUMMARY

It is the object of this invention to further develop the known vehicle display systems. In particular, a vehicle display retention system that overcomes at least some of the stated problems above.

The object is achieved by present disclosure relates to a vehicle display retention system mounted to the inside of a vehicle, in particular an A-pillar of a vehicle, configured to ensure that the vehicle display retention system remains fastened to the vehicle and does not move about the vehicle cabin in the event of an impact scenario. The vehicle display retention system comprises a display unit mounted to a display frame, an attachment component coupled to the display frame, an intermediate attachment coupled to the attachment component, and a grab bar coupled to the attachment component. The grab bar cooperates with the attachment component to mount to the A-pillar of the vehicle. The grab bar mounts to a lower portion of the A-pillar, and the intermediate adapter includes a mounting arm for attachment to an upper portion of the A-pillar. The mounting arm includes a fracture point that is intended to fail when the loading on the mounting arm reaches a given threshold. A retention member, preferably a retention strap, is coupled to the mounting arm and the vehicle. When the mounting arm fails at the fracture point, the retention strap is designed to securely retain the display unit to the A-pillar of the vehicle. This configuration enables a reduction in complexity, optimization of vehicle space, and improvement of the robustness of the system.

In a further aspect of the present invention a vehicle display system is provided, which comprises: a bracket; at least one bracket support member wherein the bracket support member comprises a receiving cavity to retain the bracket; a display cover coupled to the at least one bracket support member; a display adapter coupled to the display cover; and at least one adjustment mechanism coupled to the display cover, wherein the adjustment mechanism comprises at least one mounting member that couples to the display adapter, wherein the mounting member comprises at least one first bracket element and at least one second bracket element; a lever that is slidably engaged within the first bracket element; and a biasing element supported by the second bracket element; wherein the biasing member cooperates with the lever such that, when a first force is applied to the lever the biasing member is compressed to enable the adjustment mechanism to be translated to a desired position.

The bracket may be mounted to an attachment component for facilitating coupling to a vehicle directly or indirectly. This attachment component may be configured for driver side and/or passenger side mounting, as explained above as vehicle display retention system and in more detail further below. Thus, the disclosure of these embodiments is envisaged to be combined in a further embodiment of the invention.

According to the invention it is preferred that the vehicle display system further comprises at least one fastening member for coupling the display adapter to the display cover such that, when the fastening member is loosened, the adjustment mechanism is functional to enable movement of the display cover in relation to the bracket, and, when the fastening member is tightened, the movement of the adjustment mechanism is restricted.

It is proposed that each fastening member comprises a locking lever, with the locking lever preferably being rotatable between an open position loosening the fastening member and a closed position tightening the fastening member, and/or each fastening member comprising an eccentric screw.

Preferred embodiments of the vehicle display system according to the invention further comprise at least one first gasket located between the bracket support member and the display cover, and/or at least second first gasket located between the display cover and the display adapter, with preferably each second gasket being designed to fit on one fastening member. It is also proposed that at least one tolerance biasing element is located between the display cover and the first gasket, preferably arranged on either the inside or outside of the bracket support member.

Further, it is proposed that the tolerance biasing element cooperates with a side wall of the bracket support member and the display cover to ensure alignment of the bracket support member, and/or the tolerance biasing element cooperates with the display adapter and the bracket support member to ensure a proper mounted alignment.

According to the invention it is also proposed that the adjustment mechanism further comprises an adjustment pin that cooperates with the biasing element; and an adjustment rod that cooperates with the adjustment pin, with the adjustment rod preferably being integrally connected to the bracket or detachably coupled to the bracket.

In addition, embodiments of the present invention can be further characterized by a dividing wall, wherein the cover has the dividing wall as a physical barrier separating two adjustment mechanisms, and/or the biasing members of two adjustment mechanisms cooperate with the respective levers and the dividing wall such that, when a first force is applied to the levers the biasing members are compressed against the dividing wall to enable the adjustment mechanisms and a display screen to be translated to a desired height position, and/or, per adjustment mechanism, the lever engages and compresses the biasing member against the dividing wall for translating the adjustment pin out of the corresponding geometry of the adjustment rod.

Still further, it is proposed that there are two or four adjustment mechanisms, with each fastening member preferably cooperating with one adjustment mechanism retaining the location of the display cover in relation to the bracket, when the fastening member is in a locked position.

It is preferred according to the invention that there are at least two bracket support members between which the bracket can be vertically moved for a height adjustment, with preferably the bracket support members providing a dovetail guiding.

It is also proposed that there are four bracket support members located in proximity to the four corners of the bracket, and/or there are two first gaskets located between each bracket support member and the display cover, with preferably the first gaskets being injected into the display system during assembly.

Embodiments of the invention can further comprise at least one display screen coupled with the display adapter; wherein preferably a bezel encases the display screen.

In addition, it is proposed that the display screen comprises bonded glass.

Still further, it is proposed that the display adapter and/or the bracket is constructed from aluminum or a high-tech plastic material.

An electromagnetic shield adapter unit for cooling electric components of the vehicle display system, in particular its electronic control unit, may also be used, for example in form of the unit describe in U.S. 63/065,606 with the title "Electromagnetic Shielding (EMC) Adapter within Vehicle Display Unit" filed on Aug. 14, 2020, hereby incorporated by reference, and reference is made thereto with respect to the respective structural details.

It should be noted that the features set out individually in the following description can be combined with each other in any technically advantageous manner and set out other forms of the present disclosure. The combination of all information in the Figures and specific embodiments is encompassed by the present invention. The description further characterizes and specifies the present disclosure in particular in connection with the figures.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
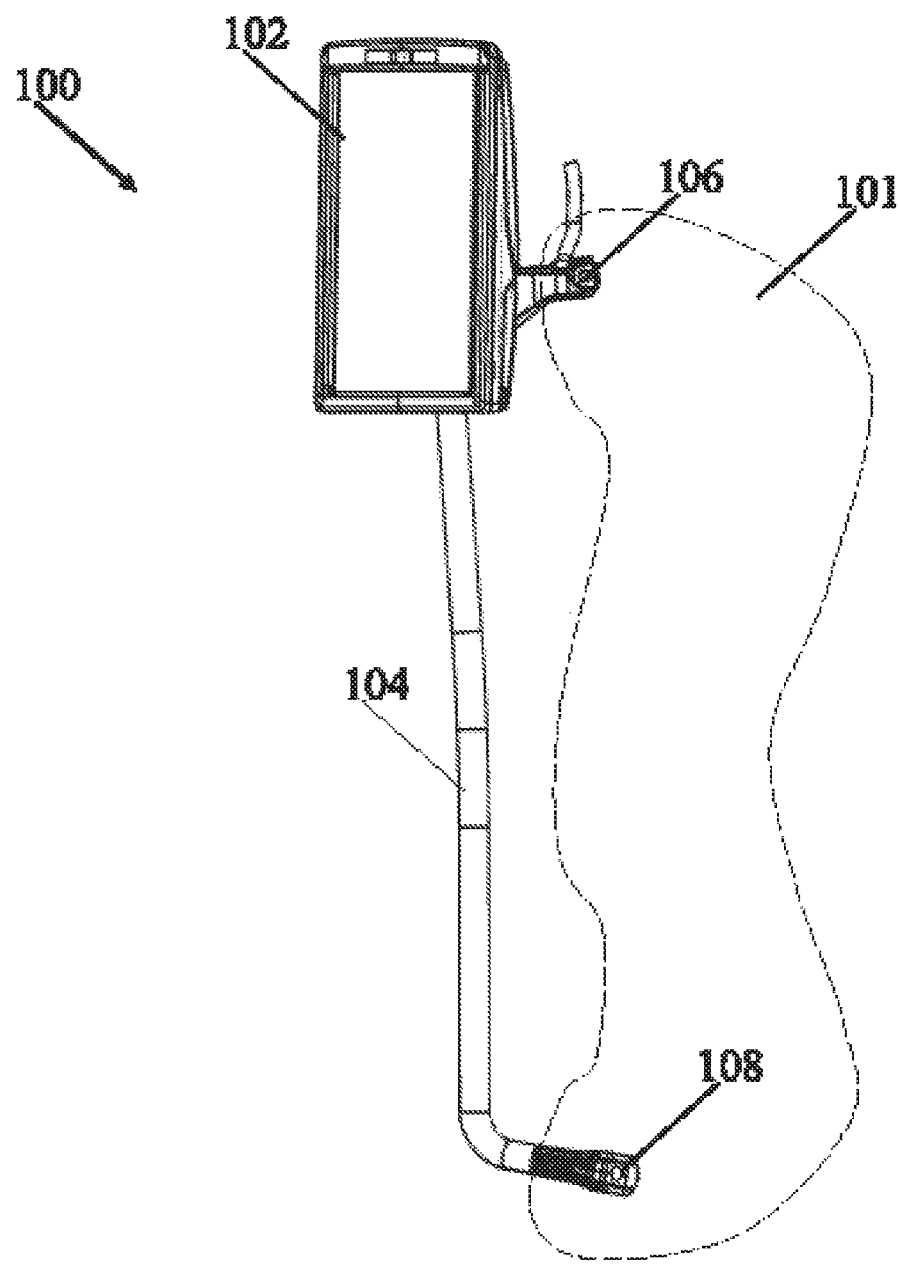
FIG. 1 depicts an isometric view of a vehicle display retention system.

The following description is merely exemplary in nature and is not intended to limit the present disclosure, application, or uses. It should be understood that throughout the drawings, corresponding reference numerals indicate like or corresponding parts and features.

FIG. 1 depicts an isometric view of a vehicle display retention system (100). The vehicle display retention system (100) includes a display unit (102) connected to a grab bar (104). The grab bar (104) is mountable to an A-pillar (101) of a vehicle via a first mounting member (106) and a second mounting member (108), and is intended to aid in facilitating the ingress and egress of a passenger from a cabin of the vehicle. A fastener, not shown, attaches the first mounting member (106) and the second mounting member (108) to the A-pillar (101) of the vehicle. Any fastener known within the art can be used and interchanged to mount the grab bar (104) to the A-pillar (101). In this form, a screw is the preferred fastener.

Figure 2:
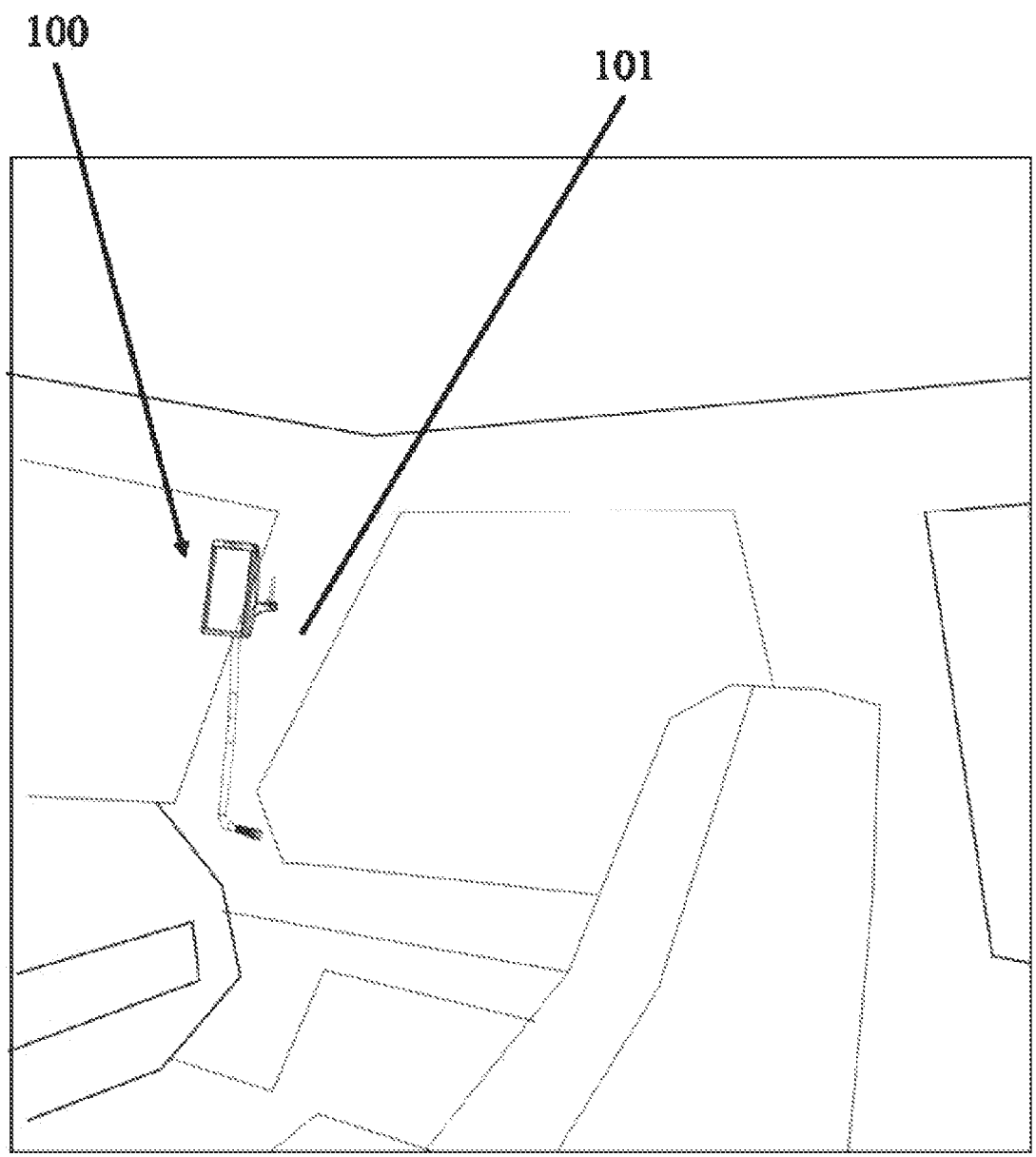
FIG. 2 depicts the vehicle display retention system mounted to the A-pillar of a vehicle.

FIG. 2 illustrates the vehicle display retention system (100) mounted to an inner surface of the A-pillar (101) of the vehicle. The vehicle display retention system (100) is able to be configured to mount to either the passenger side or driver side of a vehicle. In this form, the vehicle display retention system (100) is designed to easily adapt to mount to either side of the vehicle. It is also within the scope of this disclosure the display system 100 may also be mounted to other locations in the vehicle.

Figure 3:
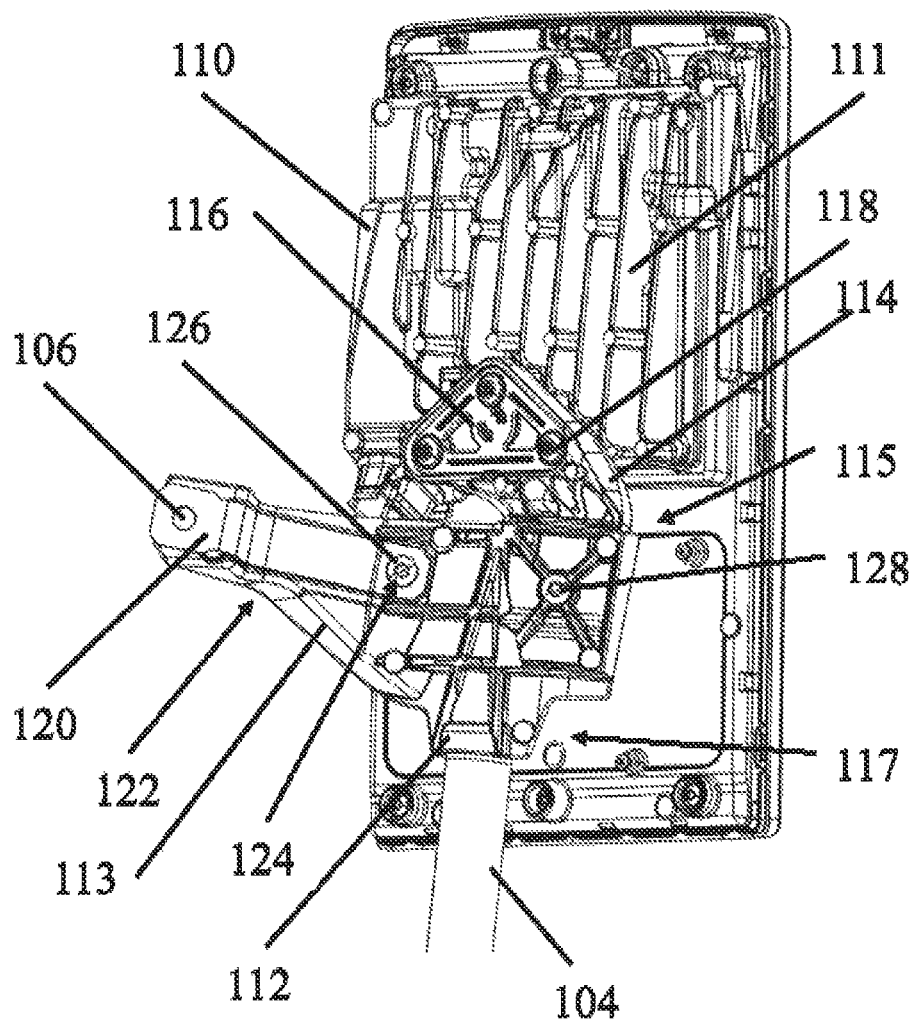
FIG. 3 depicts a rear perspective view of a vehicle display retention system.

FIG. 3 shows an isometric view of the vehicle display retention system (100). The display unit (102, FIG. 1) affixes to a display frame (110). The display frame (110) includes at least one rib member (111) along its' back surface to facilitate the heat transfer and cooling of the display unit. The rib member (111) may also be designed to facilitate the dampening and transfer of forces from the display unit (102, FIG. 1) to the vehicle. The display frame (110) is coupled to an attachment component (114) via at least one display fastener (118). In this form, there is a series of three display fasteners (118) in a triangular formation. In other variations there may be more or less display fasteners (118) to suit the design requirements. The display fasteners (118) may be any known fastening device within the art that achieves the design considerations.

Figure 4:
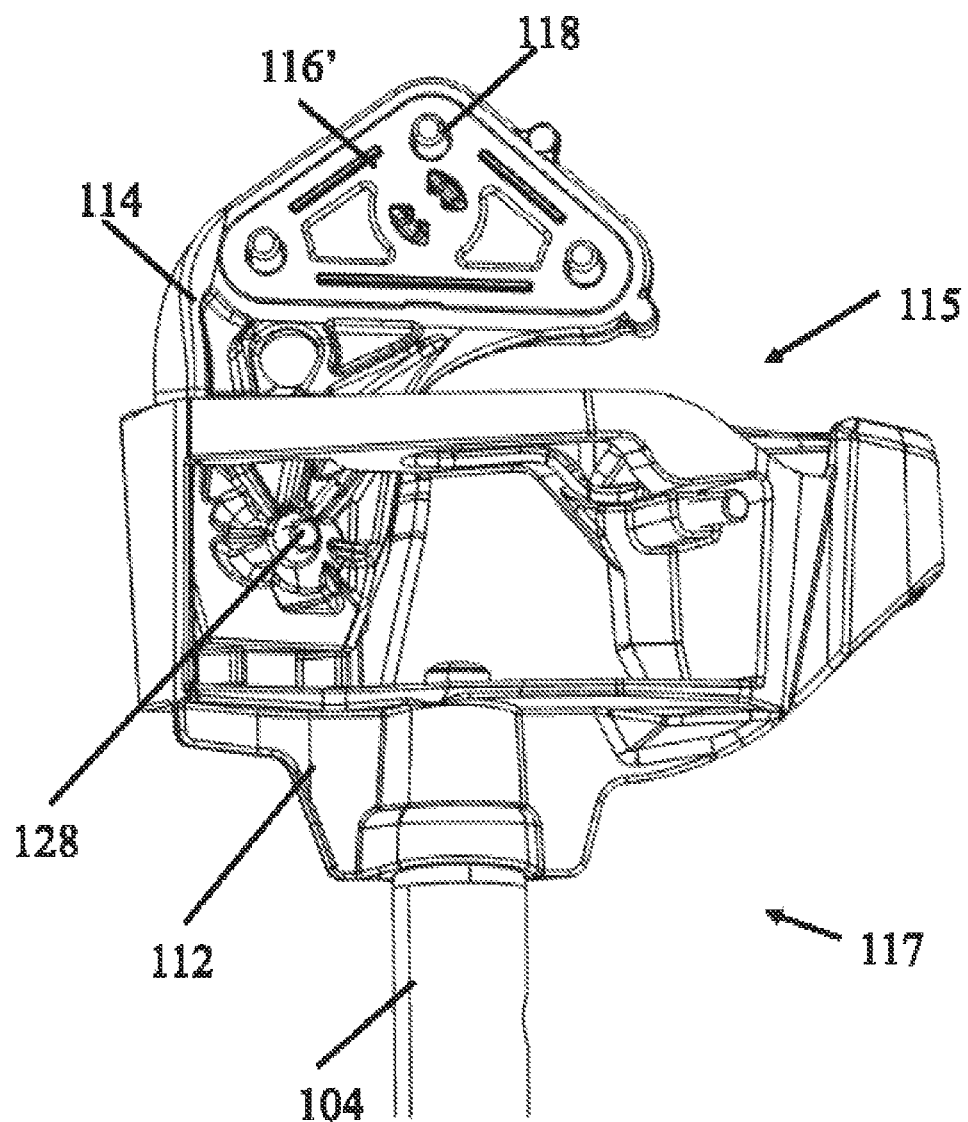
FIG. 4 depicts a front perspective view of a vehicle display retention system.

In this form, the preferred display fastener (118) is a screw. Between the display fastener (118) and the attachment component (114) is a first insulating element (116). There is a second insulating element (116') between the attachment component (114) and the display frame (110). This relationship is best seen in FIG. 4. The first insulating element (116) and the second insulating element (116') acts to prevent electrical interference and/or thermal conductance to the attachment component (114). It also serves to provide vibration dampening within the vehicle display retention system (100). The first and second insulating elements (116, 116') may be any insulating material known in the art. In this form, the first and second insulating element (116, 116') is made of a rubber material, however the first and second insulating element (116, 116') may be any insulating material known in the art to meet electrical and thermal requirements.

The attachment component (114) is coupled to an intermediate adapter (112), which couples to the grab bar (104). The intermediate adapter (112) and the attachment component (114) serves to facilitate the connection between the display frame (110), the grab bar (104), and the A-Pillar (101, FIG. 1). In this form, the intermediate adapter (112) couples to the attachment component (114) at a proximal end (115), and couples to the grab bar (104) at a distal end (117). In between the proximal end (115) and the distal end (117) the intermediate adapter (112) includes a mounting arm (113). The mounting arm (113) includes the first mounting member (106) which facilitates the attachment of the grab bar (104) to the A-pillar (101, FIG. 1). Coupled between the mounting arm (113) and the A-pillar (101, FIG. 1) is a retention strap (120). In this form, the retention strap (120) is a steel material with a width between 5 mm and 30 mm, preferably being 20 mm. In other variations, the material and width of the retention strap (120) may change to suit the design requirements. The goal of the retention strap (120) is to retain the display unit (102, FIG. 1) in the event the mounting arm (113) is damaged in an impact scenario.

The mounting arm (113) protrudes from the intermediate adapter (112), and the retention strap (120) couples to the mounting arm (113) at the first mounting member (106) and at a retention member connection point (124). At the retention member connection point (124), the retention strap (120) is fastened to the mounting arm (113) via a retention member fastener (126). In this form, the retention member fastener (126) is designed to be a screw. In other variations the retention member fastener (126) may be any other known fastener in the art to satisfy the design considerations. The retention strap (120) is intended to ensure the display frame (110) is retained in the event the loading condition on the mounting arm (113) exceeds the designed upper limit. In this scenario, the intermediate adapter (112) is designed to fail along the mounting arm (113) at a given fracture point (122). The fracture point (122) is located between the first mounting member (106) and the retention member connection point (124). If the applied force exceeds the design limit, the intermediate adapter (112) fails at the fracture point (122), the retention strap (120) is engaged and ensures the vehicle display retention system (100, FIG. 1) remains attached to the A-pillar (101, FIG. 1) of the vehicle at the first mounting member (106). This ensures the display frame (110) and the attached display unit (102, FIG. 1) does not move about the vehicle cabin in the event of an impact scenario.

FIG. 4 depicts a front perspective view of the vehicle display retention system (100). The intermediate adapter (112) is coupled to the grab bar (104) at a distal end (117). At the proximal end (115) the intermediate adapter (112) is coupled to the attachment component (114) via an attachment component fastener (128). The attachment component (114) is coupled to the second insulating element (116'), which rests between the attachment component (114) and the display frame (110, FIG. 3), inhibiting electrical interference and/or thermal conductance from the attachment component (114) to the display frame (110, FIG. 3).

Figure 5:
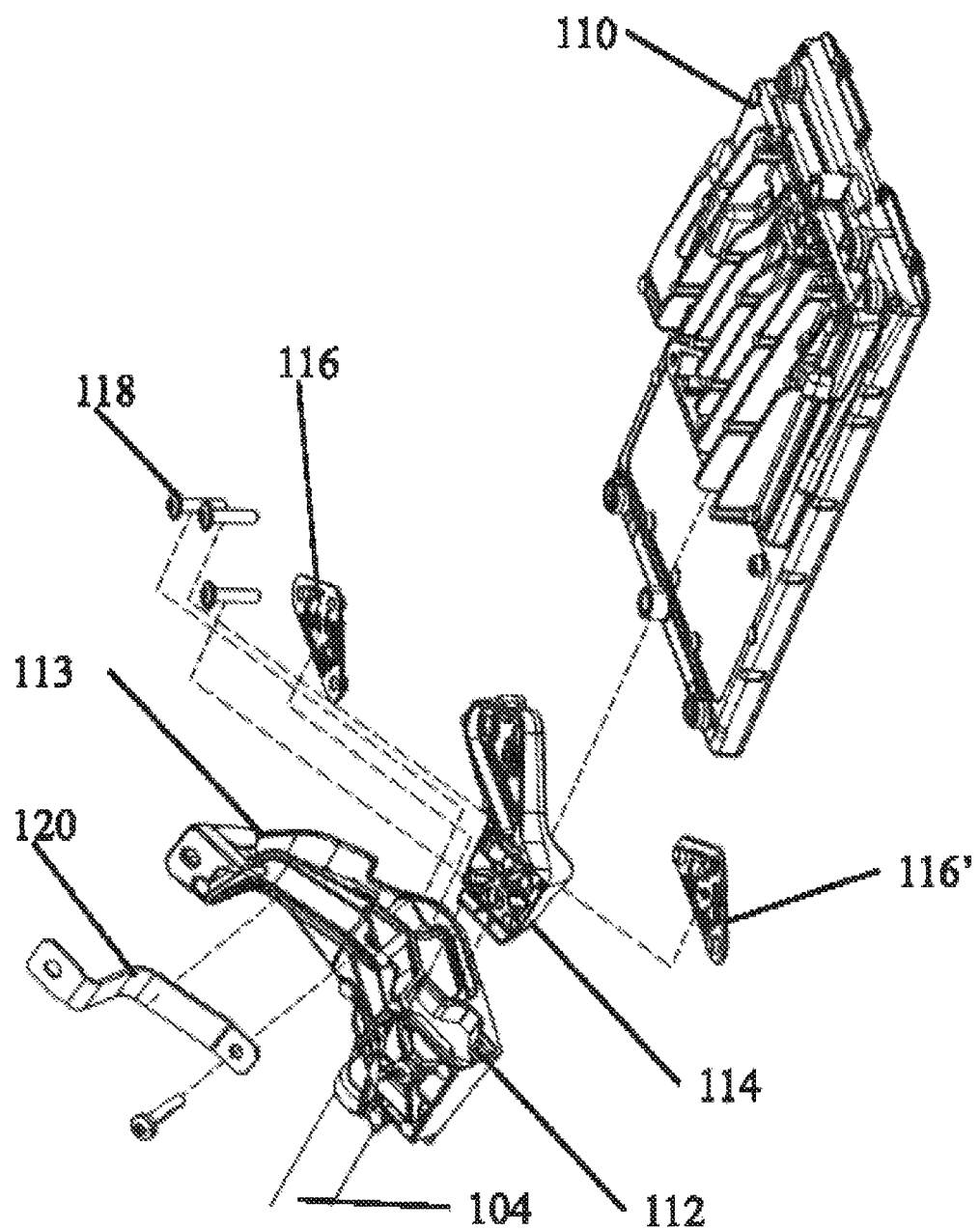
FIG. 5 depicts an exploded view of a vehicle display retention system.

FIG. 5 depicts an exploded view of the vehicle display retention system (100). This view is intended to show the relationship between the various components within the vehicle display retention system (100). As shown, and previously stated, the grab bar (104) is coupled to the intermediate adapter (112). The intermediate adapter (112) includes a mounting arm (113). Attached to the mounting arm (113) is a retention strap (120). The retention strap (120) is nestled within a groove of the mounting arm and coupled to the mounting arm (113) at two points. Coupled to the intermediate adapter (112) is the attachment component (114). The attachment component (114) is coupled to the first and second insulating element (116, 116'). The first insulating element (116) is coupled to the top of the attachment component (114), and the second insulating element (116') is coupled to the bottom of the attachment component (114). The first and second insulating elements (116, 116') are coupled to the attachment component (114) via the display fasteners (118) as shown. The display fasteners (118) also couple the display frame (110) to the attachment component (114). As shown in this form, the display fasteners (118) pass through the first insulating element, the attachment component (114), the second insulating element (116') to secure these components to the display frame (110).

Figure 6:
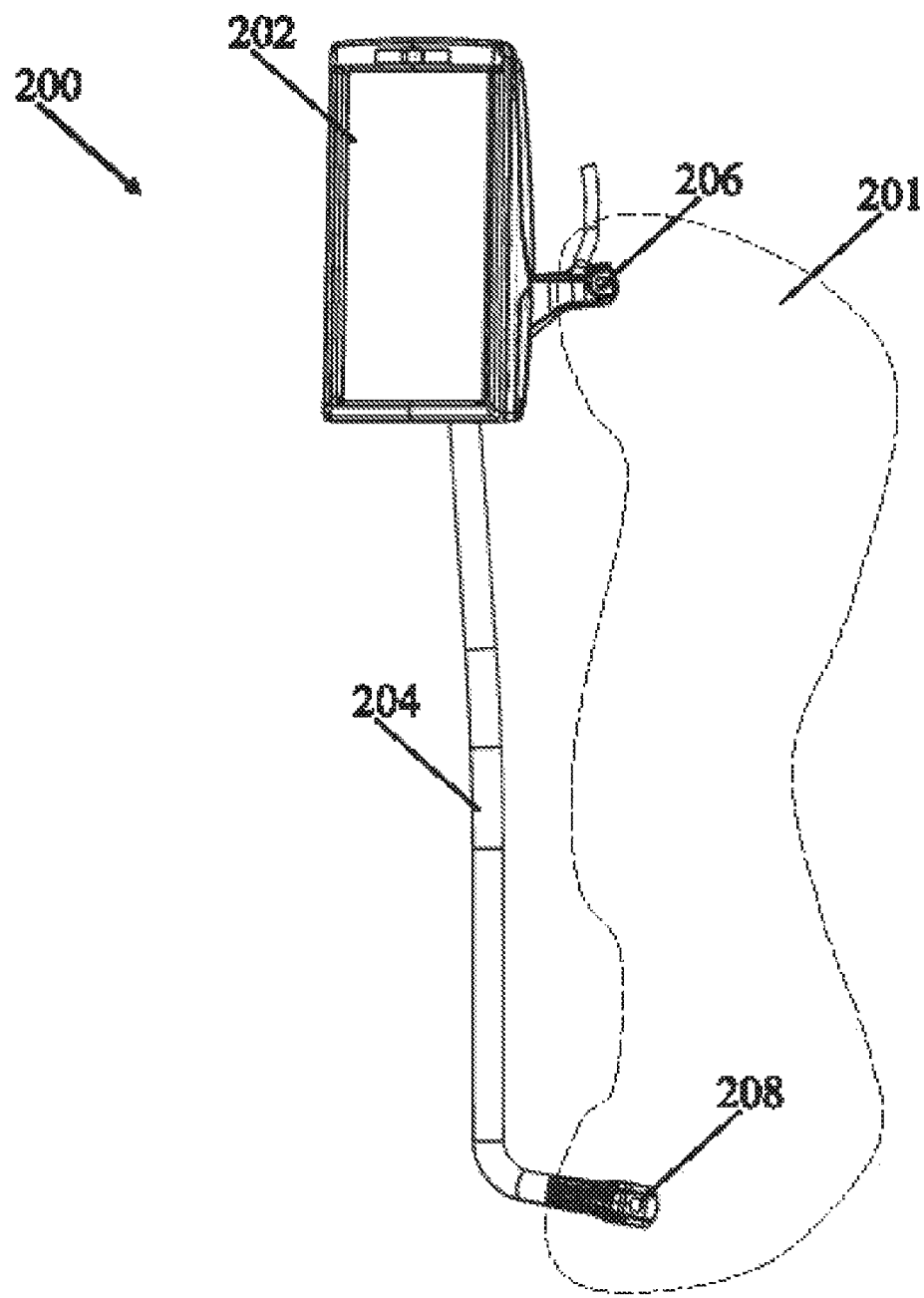
FIG. 6 depicts an isometric view of an alternate variation of a vehicle display retention system.

FIG. 6 depicts an isometric view of an alternate variation of a vehicle display retention system (200). The vehicle display retention system (200) in FIG. 6 externally looks similar to the vehicle display retention system (100) in FIG. 1. Internally, however, the vehicle display retention system (100, FIG. 1) and the vehicle display retention system (200) have distinct differences. The vehicle display retention system (200) includes a display unit (202) connected to a grab bar (204). The grab bar (204) is mountable to an A-pillar (201) of a vehicle via a first mounting member (206) and a second mounting member (208), and is intended to aid in facilitating the ingress and egress of a passenger from a cabin of the vehicle. A mounting fastener (225), shown in FIG. 9, attaches the first mounting member (206) to the A-pillar (201) of the vehicle. Another mounting fastener (225), not shown, attaches the second mounting member (208) to the A-pillar (201) of the vehicle. Any fastener known within the art can be used and interchanged to mount the grab bar (204) to the A-pillar (201). In this form, a screw is the preferred fastener.

Figure 7:
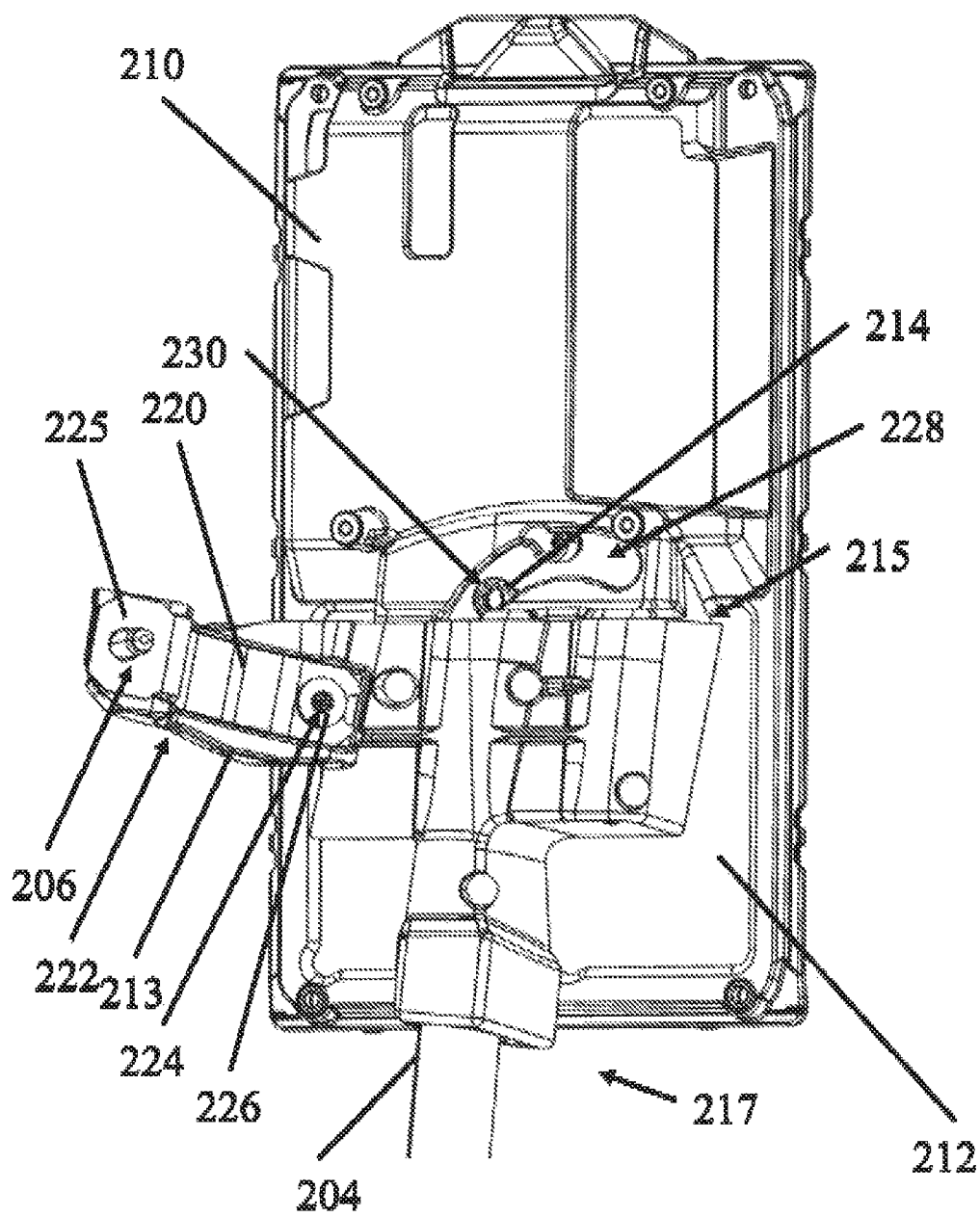
FIG. 7 depicts a rear perspective view of an alternate variation for a vehicle display retention system.

FIG. 7 shows a rear perspective view of the alternate variation of the vehicle display retention system (200). The display unit (202, FIG. 7) affixes to a display frame (210). The display frame (210) is coupled to an attachment component (214) via at least one display fastener (218), seen in FIG. 11. The attachment component (214) includes a guiding aperture (230) which is configured to receive a guiding element, not shown, and aligns with a guiding slot (228) in the display frame (210). The guiding element cooperate with the guiding slot (228) and the guiding aperture (230) to align the attachment component during assembly.

The intermediate adapter (212) is coupled to the attachment component (214) and the grab bar (204). The intermediate adapter (212) and the attachment component (214) serves to facilitate the connection between the display frame (210), the grab bar (204), and the A-Pillar (201, FIG. 6). In this form, the intermediate adapter (212) couples to the attachment component (214) at a proximal end (215), and couples to the grab bar (204) at a distal end (217). In between the proximal end (215) and the distal end (217) the intermediate adapter (212) includes a mounting arm (213). The mounting arm (213) includes the mounting member (206) which facilitates the attachment of the grab bar (204) to the A-pillar (201, FIG. 6). Coupled between the mounting arm (213) and the A-pillar (201, FIG. 6) is a retention strap (220). In this form, the retention strap (220) is a steel material with a width between 5 mm and 30 mm, with it preferably being 20 mm. In other variations, the material and width of the retention strap (220) may change to suit the design requirements. The goal of the retention strap (220) is to retain the display unit (202, FIG. 6) in the event the mounting arm (213) is damaged in an impact scenario.

The mounting arm (213) protrudes from the intermediate adapter (212), and the retention strap (220) couples to the mounting arm (213) at the first mounting member (206) and at a retention member connection point (224). At the retention member connection point (224), the retention strap (220) is fastened to the mounting arm (213) via a retention member fastener (226). In this form, the retention member fastener (226) is designed to be a screw. In other variations the retention member fastener (226) may be any other known fastener in the art to satisfy the design considerations. The retention strap (220) is intended to ensure the display frame (210) is retained in the event the loading condition exceeds the designed upper limit. In this scenario, the intermediate adapter (212) is designed to fail along the mounting arm (213) at a given fracture point (222). The fracture point (222) is located between the first mounting member (206) and the retention member connection point (224). If the applied force exceeds the design limit, the intermediate adapter (212) fails at the fracture point (222), the retention strap (220) is engaged and ensures the vehicle display retention system (200, FIG. 6) remains attached to the A-pillar (201, FIG. 6) of the vehicle at the first connection point (206). This ensures the display frame (210) and the attached display unit (202, FIG. 6) does not move about the vehicle cabin in the event of an impact scenario.

Figure 8:
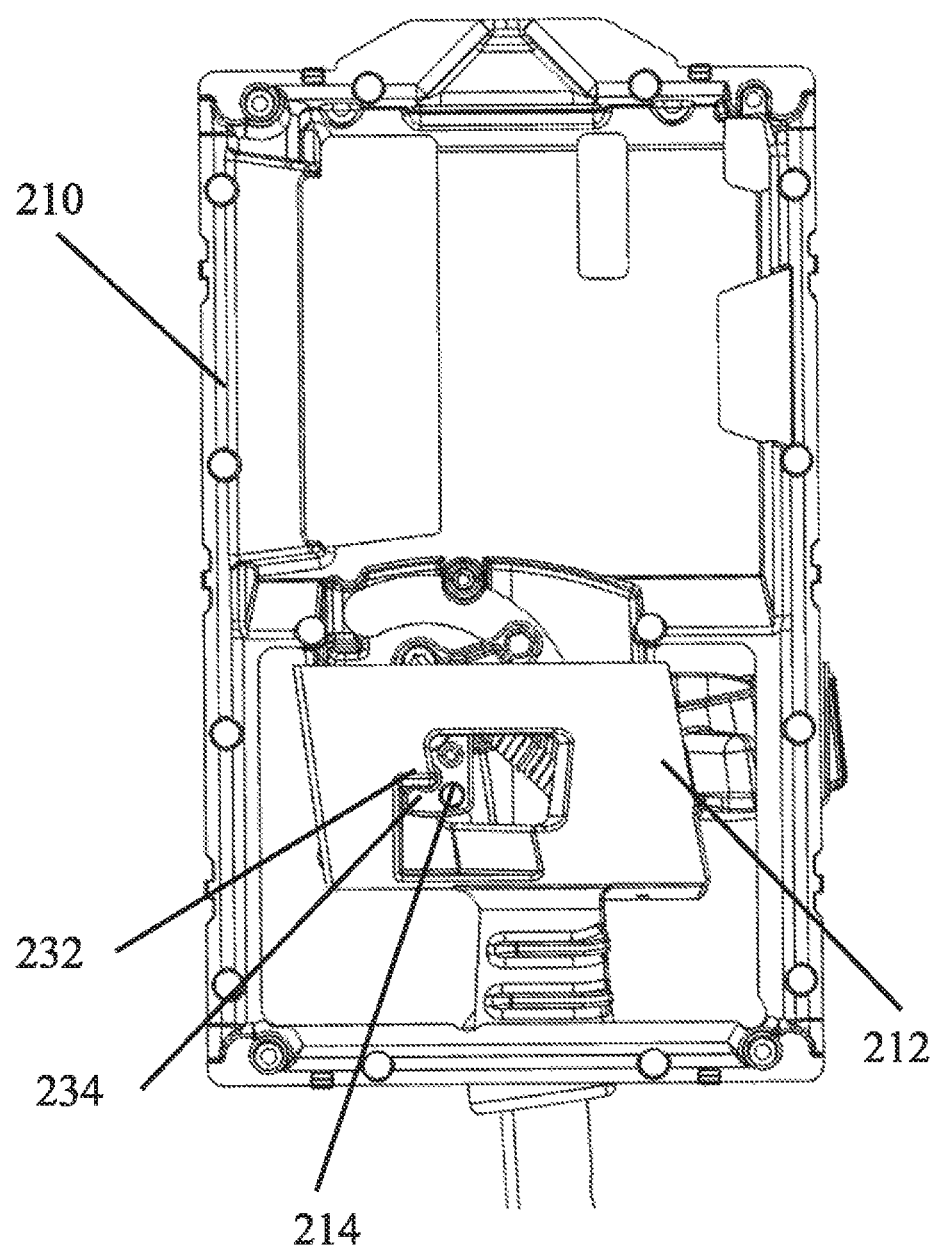
FIG. 8 depicts a front perspective view of an alternate variation for a vehicle display retention system.

FIG. 8 shows a front perspective view of the alternate variation of the vehicle display retention system (200). The display frame (210) is coupled to the attachment component (214) via a display fastener (218, FIG. 10). The attachment component (214) cooperates with the intermediate adapter (212) to retain the display frame (210) to the intermediate adapter (212). The attachment component (214) includes a securing element (234) that cooperates with a stopping surface (232) of the A-pillar (201) of the vehicle. The securing element (234) hooks on the stopping surface (232) to prevent the dislocation of the attachment component (214) from the intermediate adapter (212).

Figure 9:
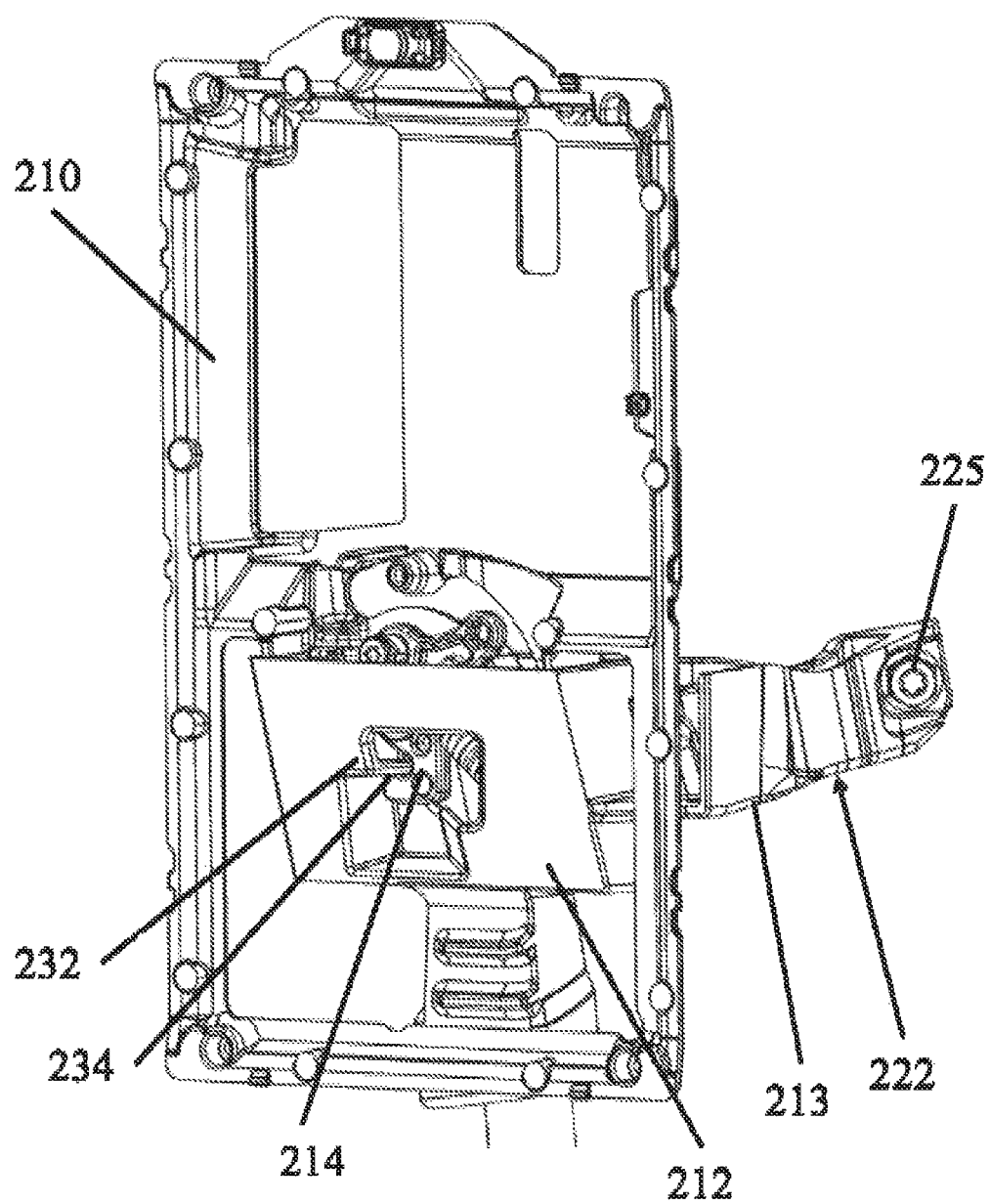
FIG. 9 depicts an isometric view of an alternate variation for a vehicle display retention system.

FIG. 9 illustrates an isometric view of the alternate variation of the vehicle display retention system (200). A wall forms the stopping surface (232) of the intermediate adapter (212). The securing element (234) cooperates with the stopping surface (232) to facilitate the connection between the attachment component (214) and the intermediate adapter (212). FIG. 9 also illustrates the fracture point (222) of the mounting arm (213). When the loads on the system reach a given threshold the mounting arm (213) is designed to fail along the fracture point (222). The vehicle display retention system (200, FIG. 7) remains attached to the A-pillar (201, FIG. 7) via the retention strap (220, FIG. 8) and the mounting fastener (225).

Figure 10:
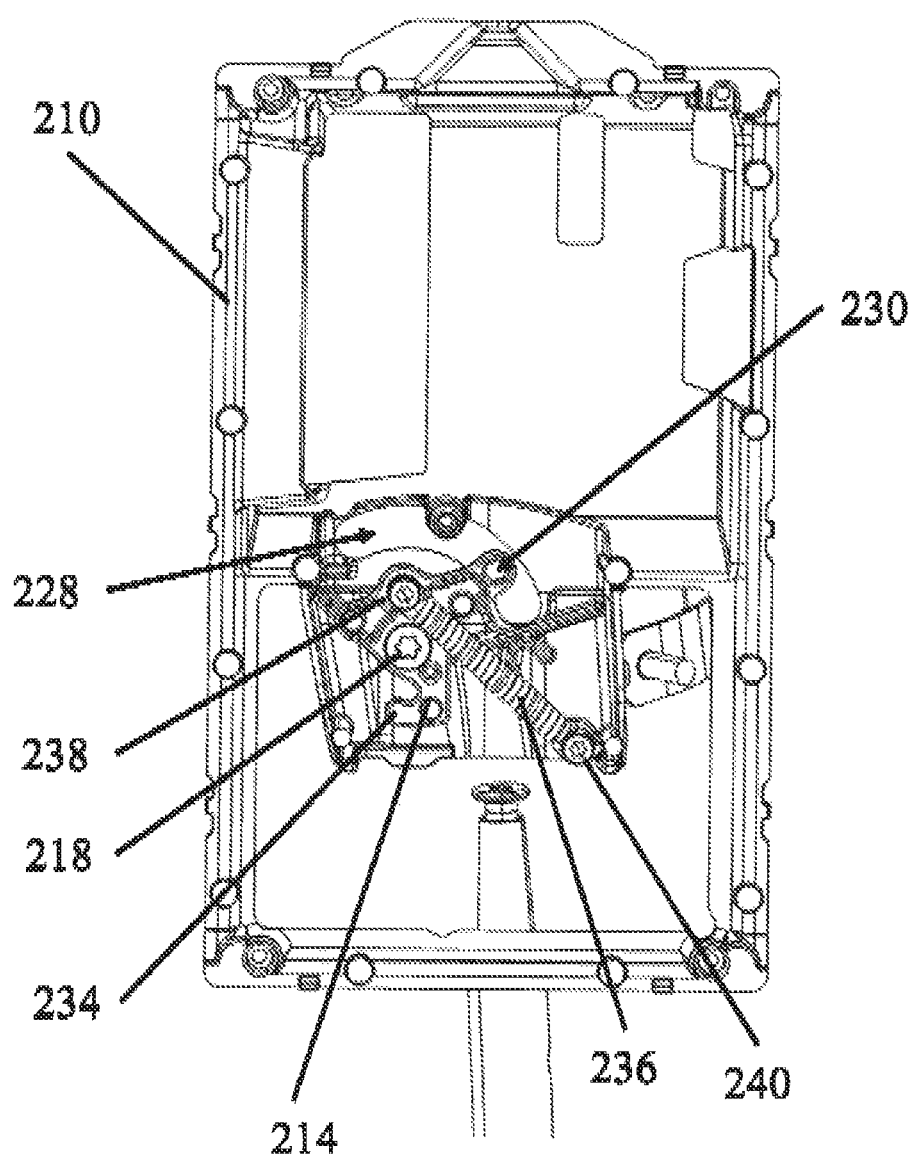
FIG. 10 depicts a front perspective view of an alternate variation for a vehicle display retention system with the intermediate attachment removed.
Figure 11:
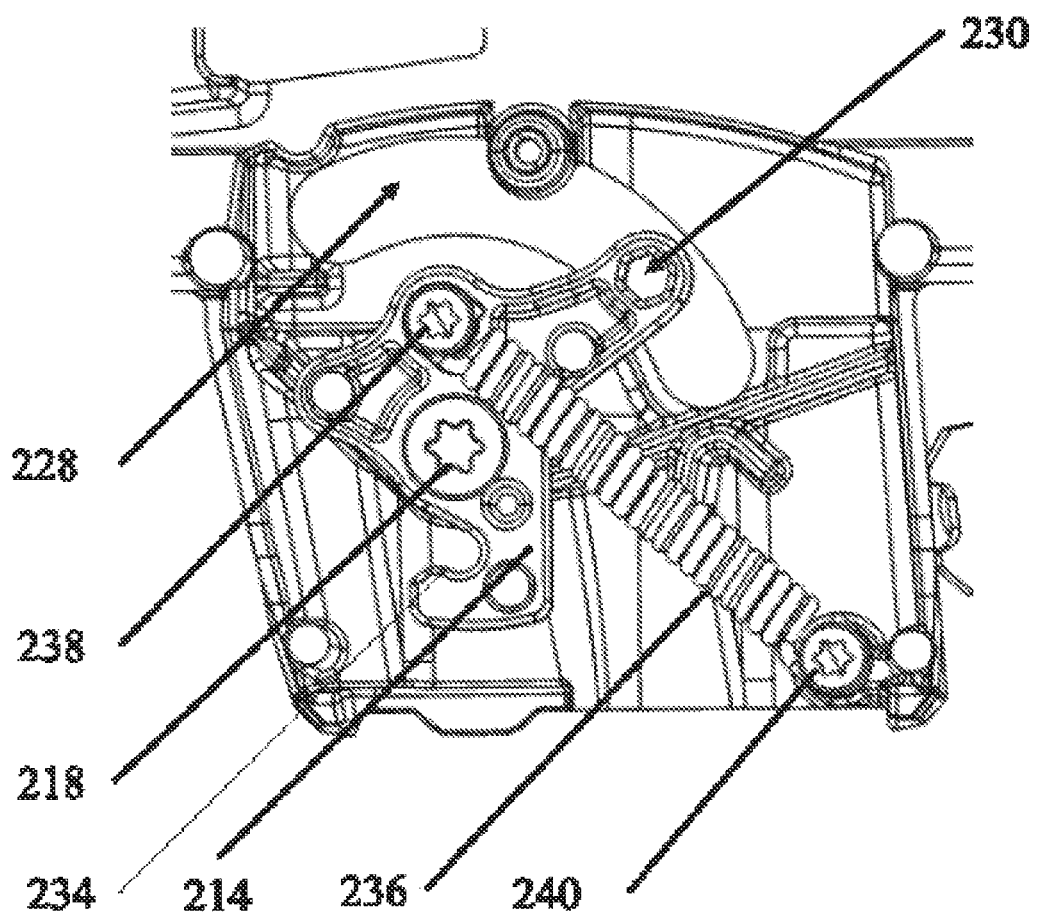
FIG. 11 depicts an isolated front perspective view of an alternate variation for a vehicle display retention system with the intermediate attachment removed.

FIG. 10 and FIG. 11 illustrate a front perspective view of the alternate variation of the vehicle display retention system (200) with the intermediate adapter (212, FIG. 10) removed to for illustration purposes. The display frame (210) couples to the attachment component (214) via the display fastener (218). In this form, there is one display fastener (218, FIG. 11). In other variations there may be more or less display fasteners (218, FIG. 11) to suit the design requirements. The display fasteners (218, FIG. 11) may be any known fastening device within the art that achieves the design considerations. In this form, the preferred display fastener (218, FIG. 11) is a screw. A biasing element (236) couples to the attachment component (214) via a first fastening element (238) and couples to the display frame (210) via a second fastening element (240). As the vehicle display retention system (200, FIG. 7) is assembled, a guiding element (not shown), is inserted through the guiding aperture (230) and cooperates with the guiding slot (228) to align the attachment component (214). As the guiding element is maneuvered along the guiding slot (228) the biasing element (236) is compressed. The securing element (234) transitions to engage the stopping surface (232, FIG. 9) of the intermediate adapter (212, FIG. 9). The stopping surface (232) and the biasing element (236) cooperate to lock the attachment component (214) in place, thus securing the display frame (210) to the intermediate adapter (212, FIG. 9).

Figure 12:
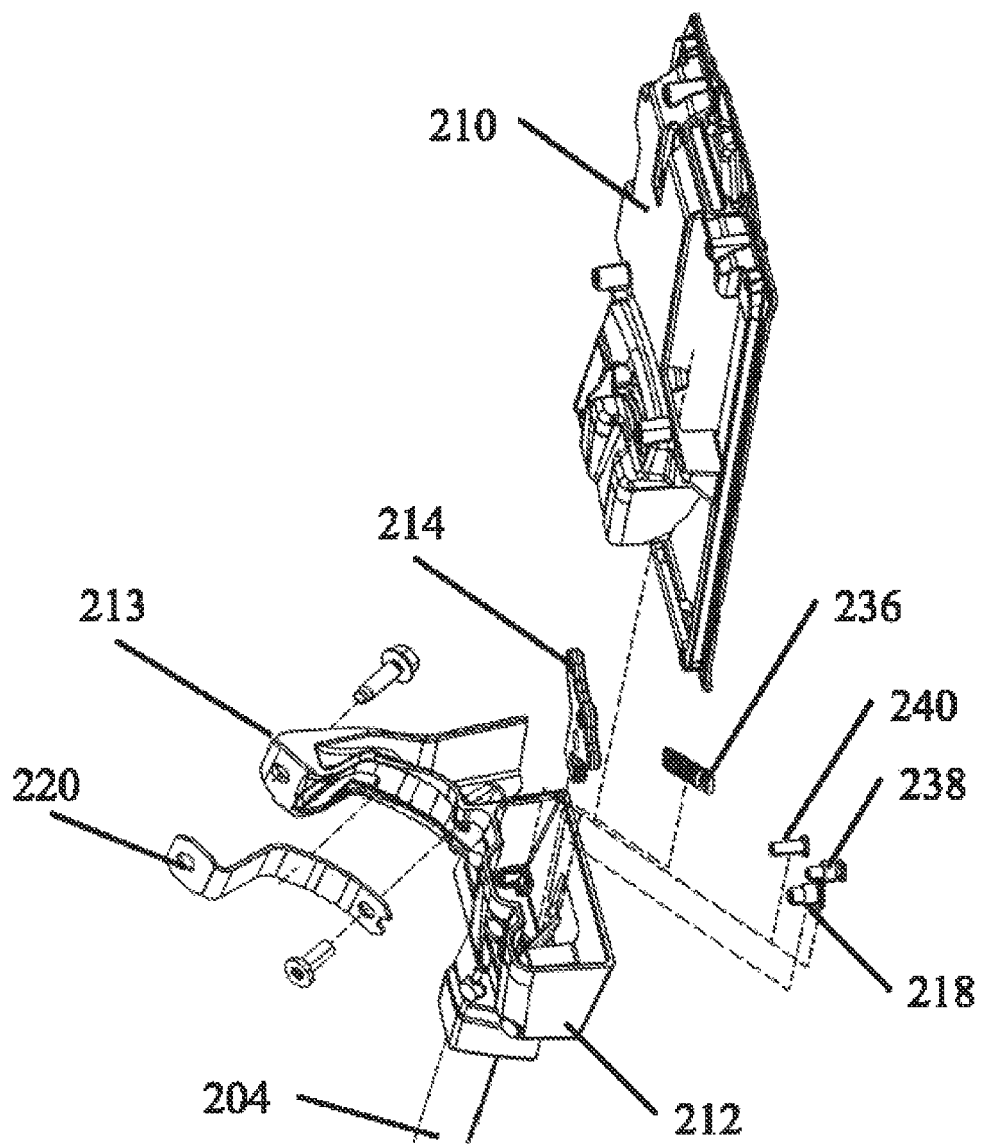
FIG. 12 depicts an exploded view of an alternate variation for a vehicle display retention system.

FIG. 12 depicts an exploded view of the alternate variation of the vehicle display retention system (200). This view is intended to show the relationship between the various components within the vehicle display retention system (200). As shown, and previously stated, the grab bar (204) is coupled to the intermediate adapter (212). The intermediate adapter (212) includes a mounting arm (213). Attached to the mounting arm (213) is a retention strap (220). The retention strap (220) is coupled to the mounting arm (213) at two points. Coupled to the intermediate adapter (212) is the attachment component (214). The biasing element (236) is coupled to the attachment component (214) via the first fastening element (238) and the second fastening element (240). The attachment component (214) is coupled to the display frame (210) via the display fastener (218).

Figure 13A:
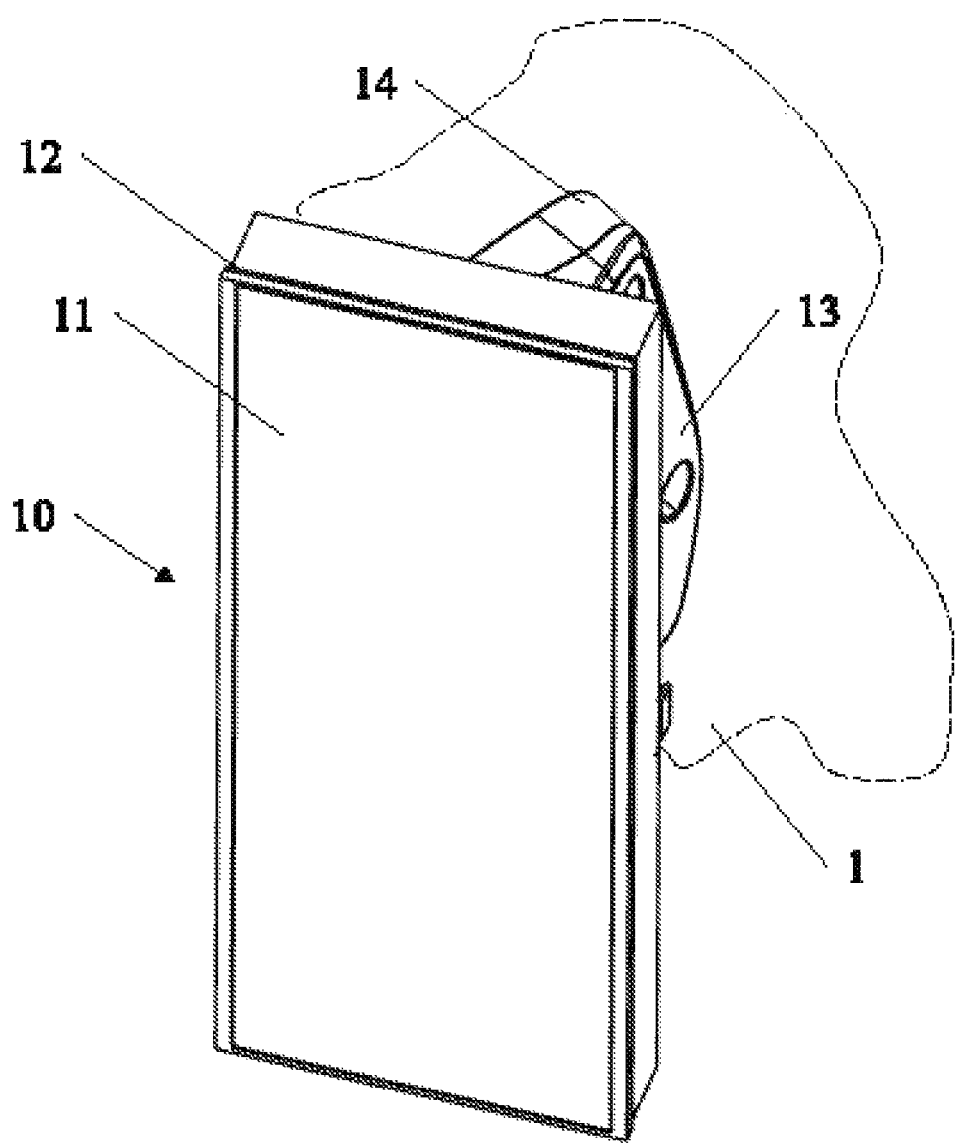
FIG. 13a depicts an isometric perspective view of a further vehicle display system of the invention.
Figure 13B:
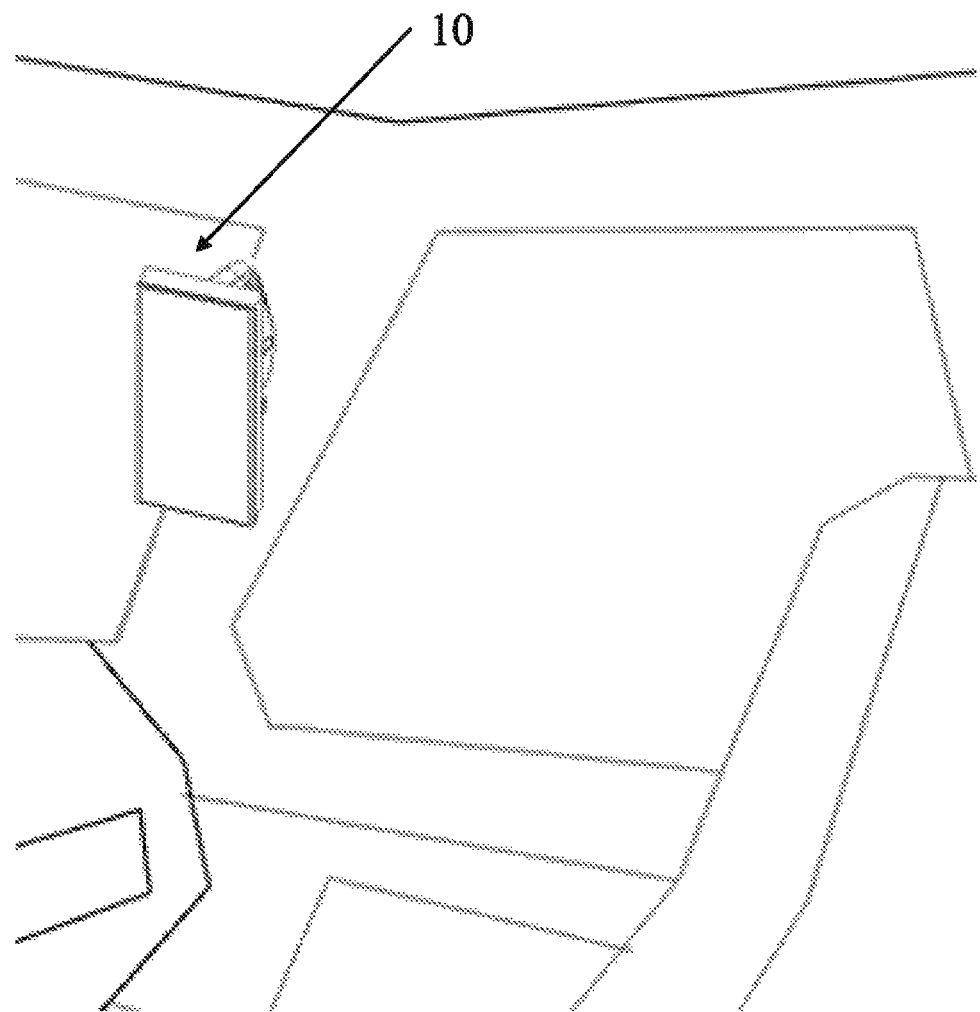
FIG. 13b depicts the further vehicle display system mounted to an A-pillar of a vehicle.

FIG. 13a depicts an isometric perspective view of another embodiment of the display system 10 for a vehicle 1 of the invention, which has to be read in connection with any of the oter embodiments described herein. The display system 10 comprises a display screen 11 and a bezel 12. The bezel 12 surrounds the display screen 11, wherein the display screen 11 is a form of bonded glass. Further, the bezel 12 may be configured to accept paint to alter the appearance of the bezel 12. The display system 10 further comprises an inner bracket cover 13 and an outer bracket cover 14. The outer bracket cover 14 and inner bracket cover 13 cooperate to provide protection and improved appearance for a bracket 16, shown in FIG. 14. The bracket 16 provides a means for attachment of the display system 10 to a vehicle 1. The bracket 16 may be mounted to an attachment component for facilitating coupling to the vehicle directly or indirectly. This attachment component may be configured for driver side and/or passenger side mounting as explained in detail above. In the configuration of FIG. 13b the display system 10 mounts to a vehicle A-pillar. In other configurations the display system may mount to a vehicle door, a windshield, a grab bar attached to the vehicle, or any other vehicle structure.

FIG. 13b depicts the display system 10 mounted to the A-pillar of the vehicle 1, with the display system 10 being adjustable up to 75 mm while maintaining crash safety requirements. The adjustability of this design enables movement of the perpendicular of the display system 10 to align with the eyes of the driver (not shown). This design also allows for the adjustment of the display system 10 without additional tooling such as screw drivers, hammers, hex keys, or similar devices.

Figure 14:
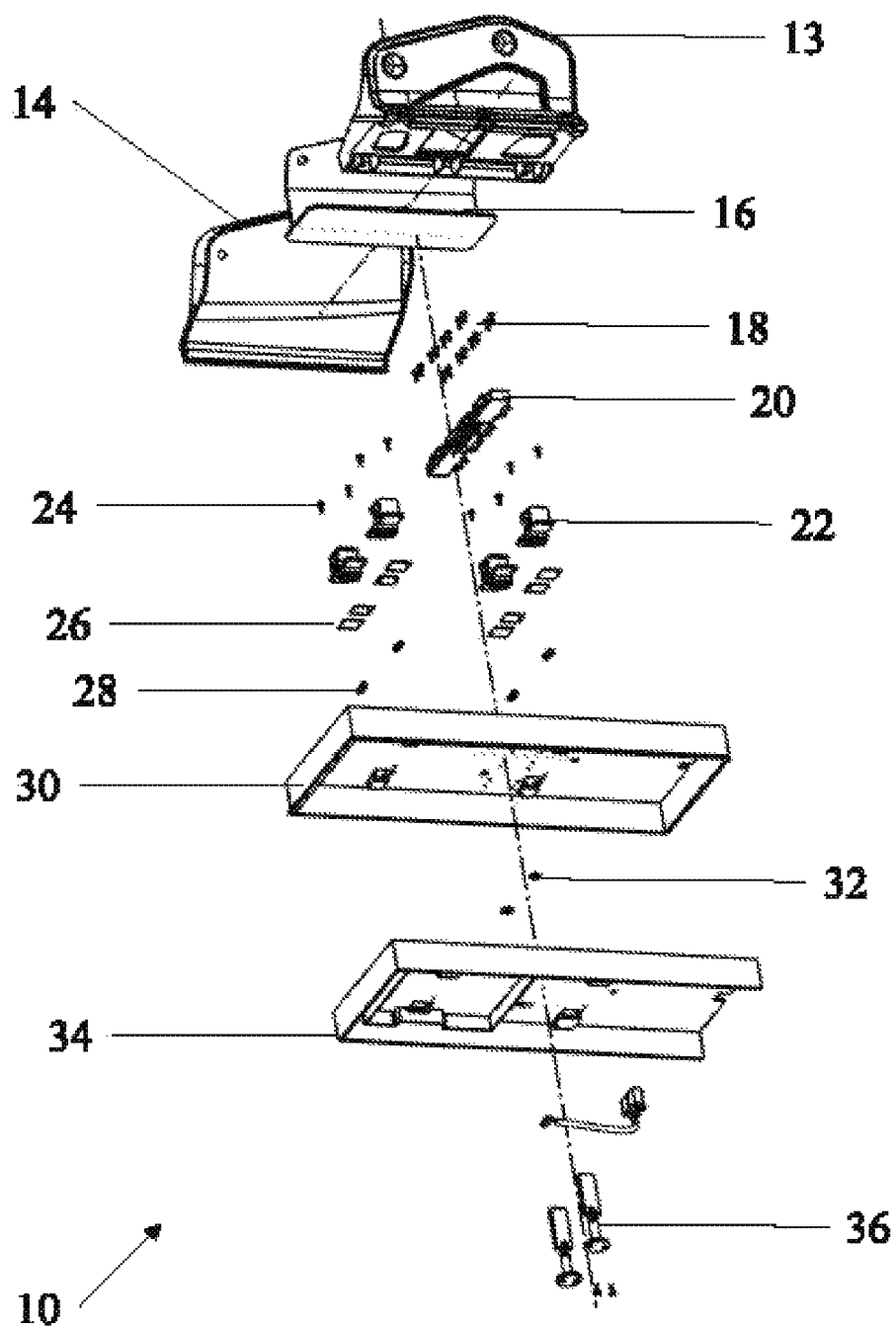
FIG. 14 depicts an exploded view of a vehicle display height adjustment assembly.

FIG. 14 depicts an exploded view of the display system 10 emphasizing a vehicle display height adjustment assembly. The inner bracket cover 13 and the outer bracket cover 14 cooperate with the bracket 16. The bracket 16 facilitates the connection between the display system 10 and the vehicle 1 by attaching to the A-pillar. The bracket 16 is coupled to a display cover 30 via at least two bracket support members 22. In this configuration, there are four bracket support members 22 located in proximity to the four corners of the bracket 16. The bracket 16 is designed to be slidably coupled within the bracket support members 22. The bracket support members 22 are coupled to the display cover 30 and a display adapter 34 via at least one bracket support fastener 24. In this configuration, two bracket support fasteners 24 are used for each bracket support member 22 and are located in opposite corners of the bracket support member 22.

In this configuration the display adapter 34 and the bracket 16 are constructed from aluminum or a high-tech plastic material. These material ensure forces applied to the display system are strucutrally received and contained by the display adaptor 34 or the bracket 16.

An electromagnetic shield adapter unit for cooling electric components of the vehicle display system, in particular its electronic control unit, may be used, for example in form of the unit describe in U.S. 63/065,606 with the title "Electromagnetic Shielding (EMC) Adapter within Vehicle Display Unit" filed on Aug. 14, 2020, hereby incorporated by reference, and reference is made thereto with respect to the respective structural details.

At least one first gasket 26 is located between the bracket support member 22 and the display cover 30. Each first gasket 26 reduces system vibration, and may seal the system to inhibit the transfer of contaminants. In this configuration two first gaskets 26 are located between each bracket support member 22 and the display cover 30. In this configuration the first gaskets 26 are injected into the display system 10 during assembly. In other variations the first gaskets 26 may be incorporated into the display system 10 via other means during assembly as well.

Located between the display cover 30 and the first gaskets 26 is at least one tolerance biasing element 28. In this configuration there is one tolerance biasing element 28 with each bracket support member 22. In other configurations there may be more than one tolerance biasing element 28. Each tolerance biasing element 28 may be located on either the inside or outside of the bracket support member 22.

Figure 17:
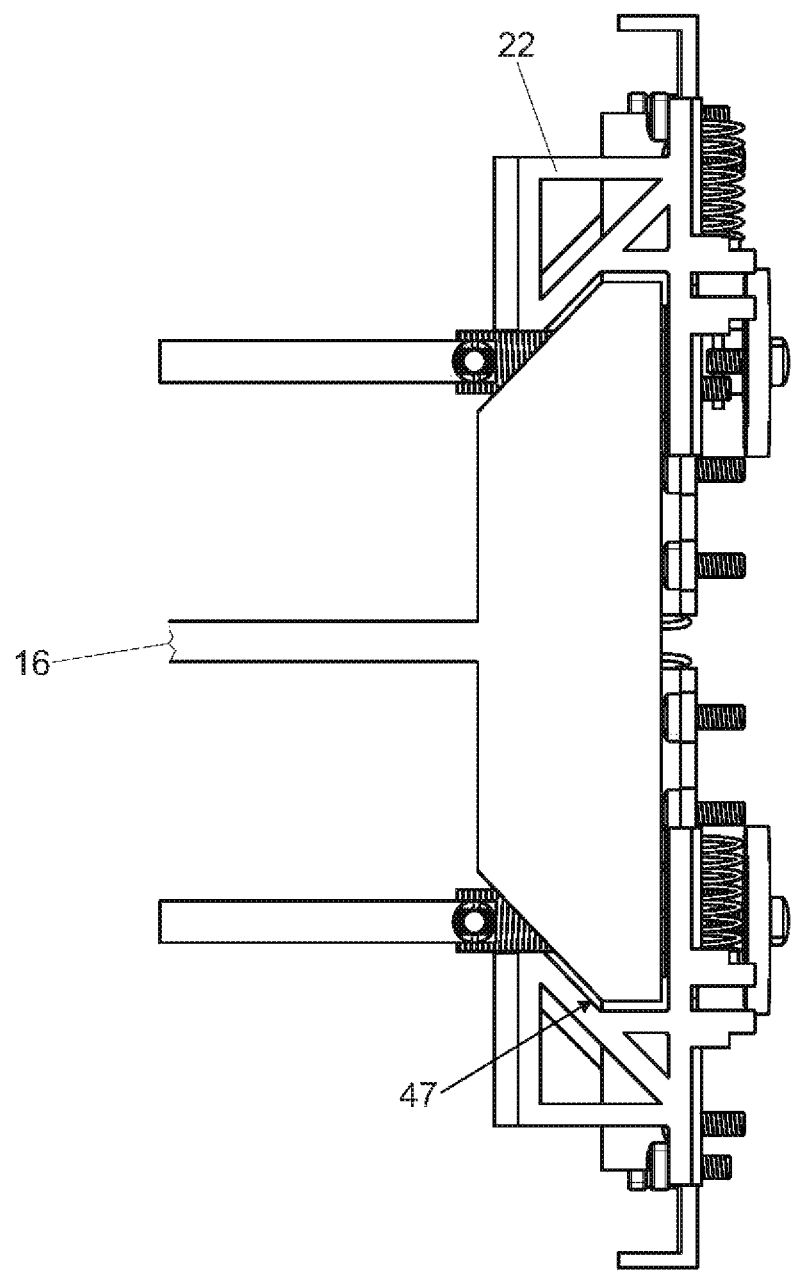
FIG. 17 depicts a top perspective view of the vehicle display height adjustment assembly with the covers removed.

The tolerance biasing elements 28 cooperate with a side wall 45, see FIG. 17, of the bracket support member 22 and the display cover 30 to ensure alignment of the bracket support member 22. In other configurations the tolerance biasing element 28 may cooperate with the display adapter 34 and the bracket support member 22 to ensure a proper mounted alignment.

Additionally, an adjustment mechanism 20 is coupled to the display cover 30 and display adapter 34 via at least one adjustment mechanism fastener 18 and positioned between the display cover 30 and the bracket 16. The height of the display system 10 may be adjusted by the cooperation of the adjustment mechanism 20 with the display cover 30 and the bracket 16. In this configuration there are two adjustment mechanisms 20. However, other designs may have more or less adjustment mechanisms 20 to meet design requirements.

The display adapter 34 is coupled to the display cover 30. At least one fastening member 36 cooperates with the display adapter 34 and the display cover 30. When the fastening member 36 is loosened, the adjustment mechanism 20 is functional to enable movement of the display cover 30 in relation to the bracket 16. Whereas, when the fastening member 36 is tightened, the movement of the adjustment mechanism 20 is restricted. In this configuration there are two fastening members 36, which are eccentric screws. Alternatively, there can be more or less of these in other configurations to comply with design requirements.

Between the display cover 30 and the display adapter 34 is at least one second gasket 32 designed to fit on the fastening member 36. Each second gasket 32 is able to reduce vibration, and seal the system to inhibit the transfer of contaminants. In this configuration there are two second gaskets 32, but in other configurations there may be more or less to meet design requirements.

Figure 15:
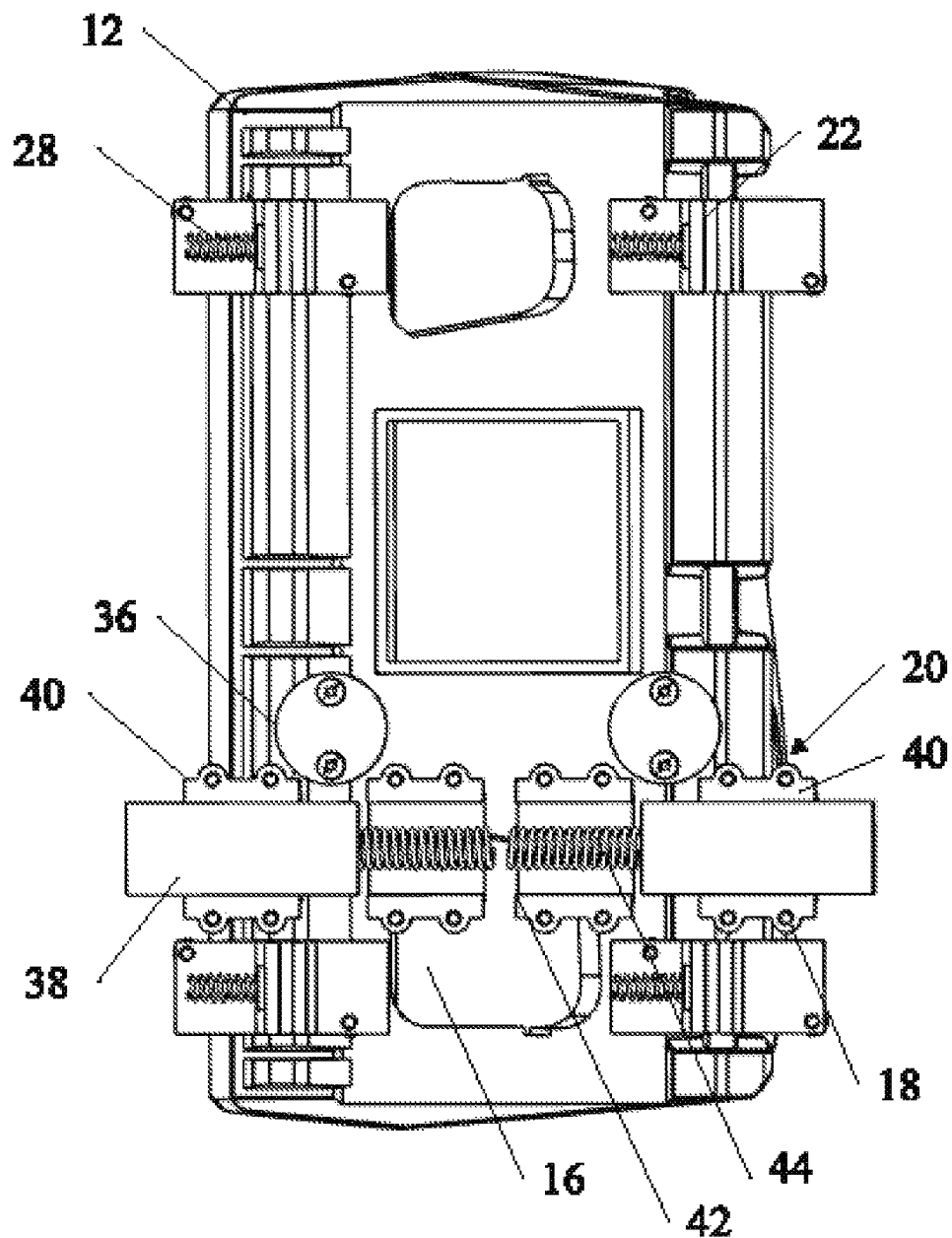
FIG. 15 depicts a front perspective view of the vehicle display height adjustment assembly.

FIG. 15 depicts a front view of the vehicle display height adjustment assembly. The bracket 16 is designed to be positioned between the bracket support members 22 and be slidably coupled. In this configuration the tolerance biasing elements 28 are located on the outside of the two bracket support members 22 on the left side and on the inside of the two bracket support members 22 on the right side. In other configurations the tolerance biasing elements 28 may be located on the inside or outside of all bracket support members 22. The tolerance biasing elements 28 shift the bracket support members 22 onto a support area in the display adapter 34. The support areas are in parallel within a specific range to decrease the tolerance range of the bracket support members 22 to each other. This prevents the system from jamming, and ensures it is robust and of high quality.

In this configuration the vehicle display height adjustment assembly contains two adjustment mechanisms 20. Both adjustment mechanisms 20 are engaged simultaneously in order to adjust the display system 10. This ensures that a user will need to use both hands to engage both adjustment mechanisms 20 and provide the required support to inhibit the display system 10 slipping into an unintended end position.

Each adjustment mechanism 20 is comprised of a lever 38, a first bracket element 40, a second bracket element 42, and a biasing member 44. The first bracket element 40 and the second bracket element 42 are coupled to the display adapter 34 via four adjustment mechanism fasteners 18 for each bracket. The first bracket element 40 supports the lever 38 and acts as a guide for when the lever 38 is slidably engaged. The second bracket element 42 supports the biasing member 44. In this configuration the second bracket element 42 acts as a guide for the biasing member 44. In other configurations the biasing member 44 and/or second bracket element 42 may be coupled to a dividing wall 46 shown in FIG. 16.

The fastening member 36 is located near the adjustment mechanism 20 and cooperates with the adjustment mechanism 20 to assist in retaining the location of the display cover 30 in relation to the bracket 16. When the fastening member 36 is in a locked position, the fastening member 36 provides sufficient force to retain display adapter 34 to the bracket 16.

Figure 16:
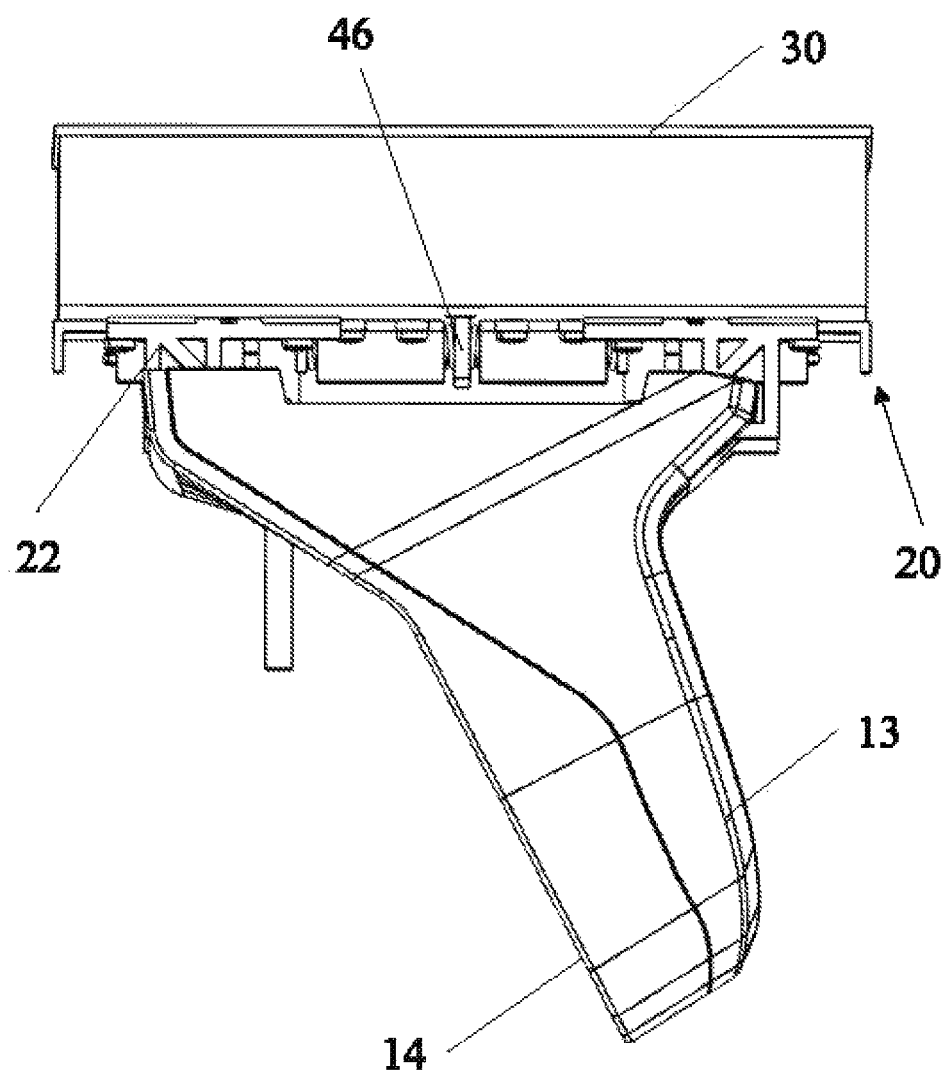
FIG. 16 depicts a top perspective view of the vehicle display height adjustment assembly.

In FIG. 16 a top perspective view of the vehicle display height adjustment assembly is shown. The inner bracket cover 13 and the outer bracket cover 14 cooperate to cover the bracket 16. The adjustment mechanism 20 cooperates with the bracket 16, the display adapter 34, and the display cover 30 to adjust the height of the display system 10. The cover 30 has the dividing wall 46 which in this form provides a physical barrier separating the two adjustment mechanisms 20.

FIG. 17 depicts a top perspective view of the vehicle display height adjustment assembly with the inner bracket cover 13, outer bracket cover 14, and display cover 30 removed. It best demonstrates how the bracket 16 is configured to fit within a receiving cavity 47 of the bracket support members 22. The bracket support members 22 slidably couple the bracket 16 to the display cover 30.

Figure 18:
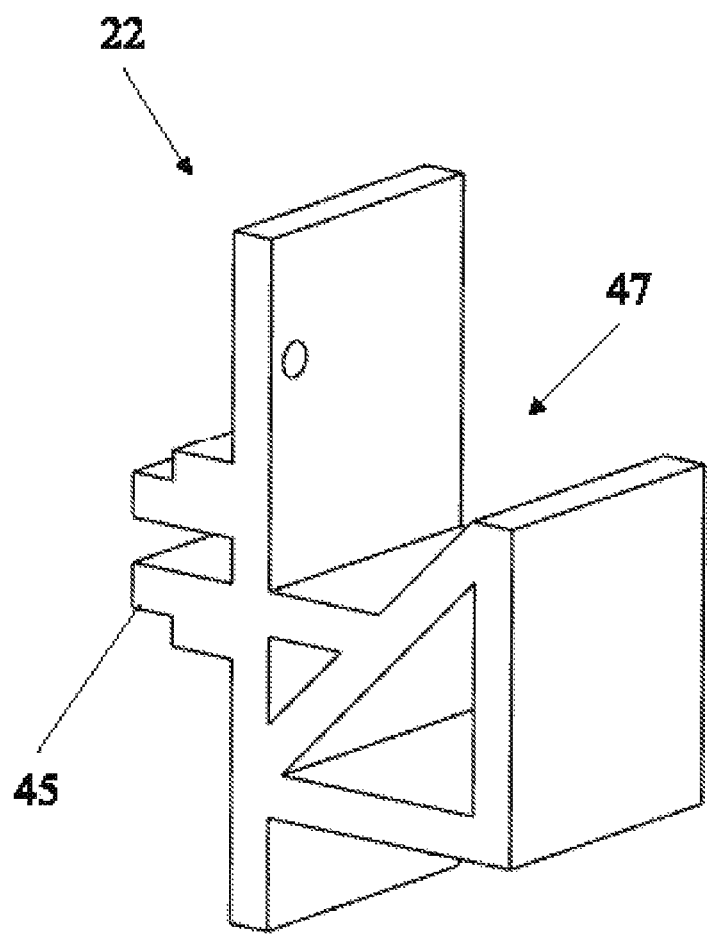
FIG. 18 depicts an isometric perspective view of a bracket support member, and covers removed.

FIG. 18 depicts an isometric perspective view of one bracket support member 22. Specifically, it illustrates the geometry of the receiving cavity 47 designed to engage the bracket 16. It also shows the side wall 45 that the tolerance biasing elements 28 abuts as seen in FIG. 15.

Figure 19:
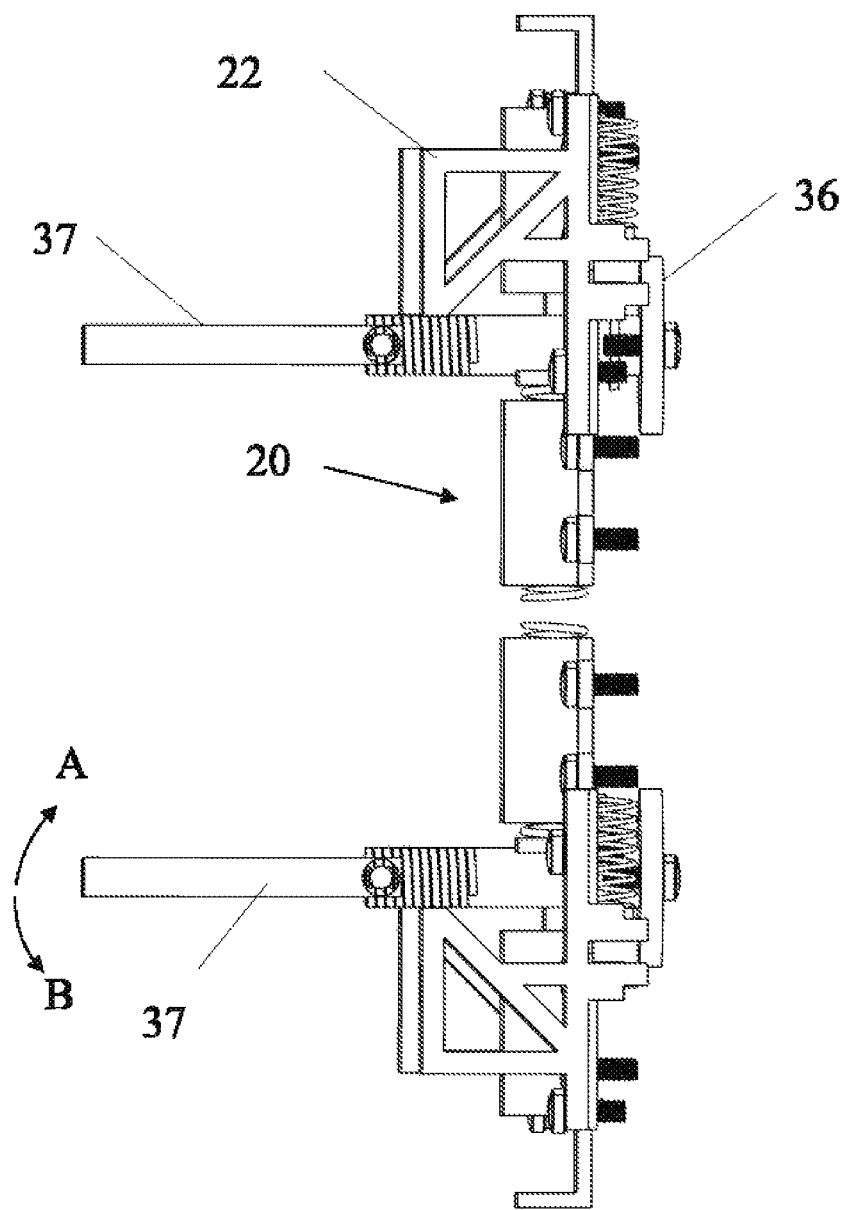
FIG. 19 depicts a top perspective view of the vehicle display height adjustment assembly with the bracket.

FIG. 19 depicts a top perspective view of the vehicle display height adjustment assembly with the bracket 16 removed. Each fastening member 36 includes a locking lever 37. FIG. 19 illustrates the locking levers 37 in an open position. When the locking levers 37 are in an open position, the fastening members 36 are unengaged and enable the movement of the adjustment mechanisms 20 and the display 10. When one locking lever 37 is rotated inwards in a first direction A, it shifts to a closed position and the respective fastening member 36 is engaged. When said fastening member 36 is engaged, the locking force provided by the fastening member 36, prevents movement of the display cover 30. From the closed position, the locking lever 37 is rotated in a second direction B to the open position.

Figure 20:
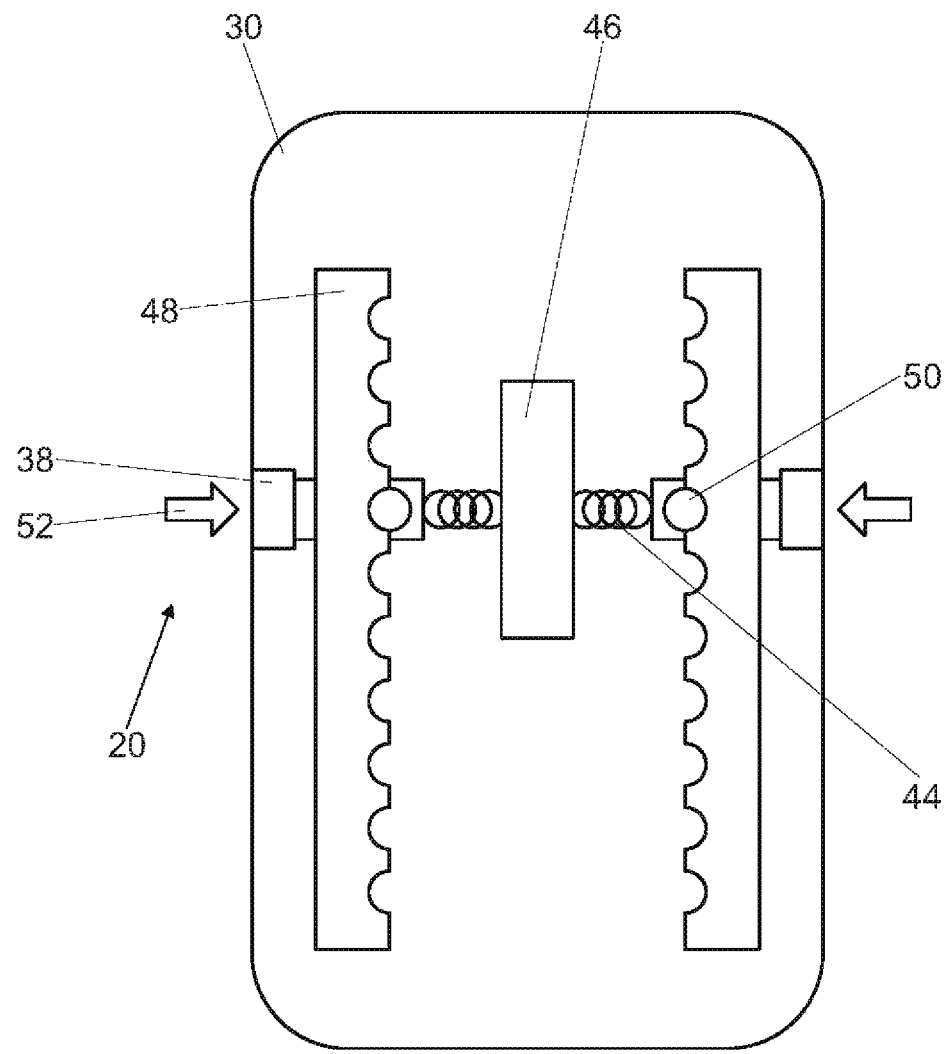
FIG. 20 depicts a front perspective view of the vehicle display height adjustment assembly emphasizing the height adjustment mechanism in a relaxed position.
Figure 21:
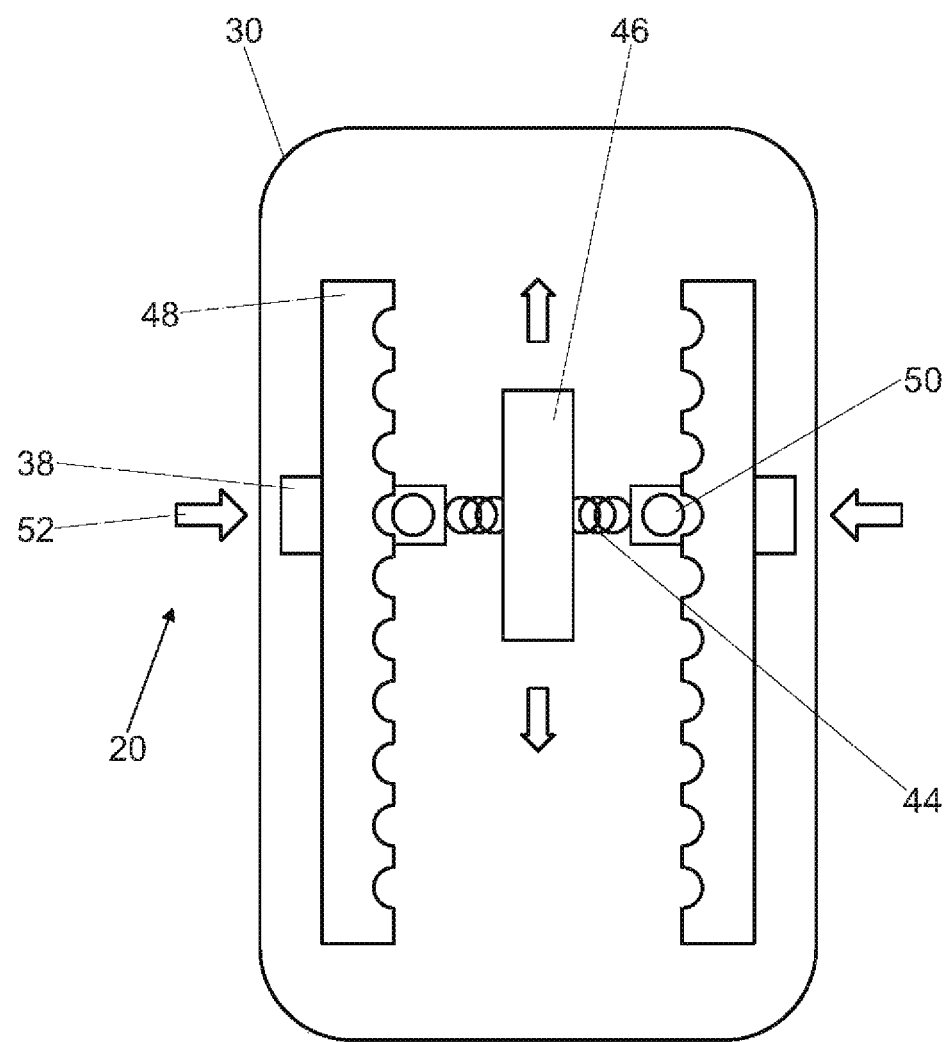
FIG. 21 depicts a front perspective view of the vehicle display height adjustment assembly emphasizing the height adjustment mechanism in an engaged position.
Figure 22:
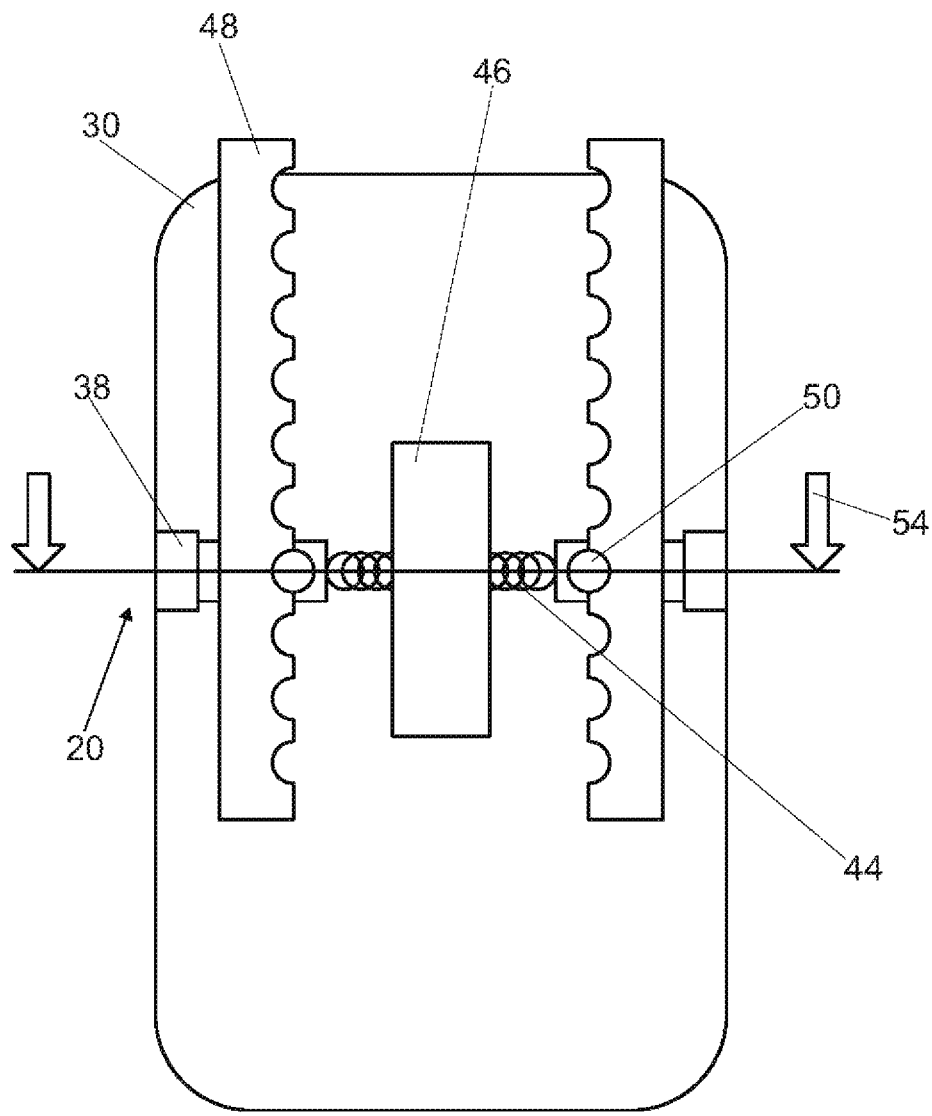
FIG. 22 depicts a front perspective view of the vehicle display height adjustment assembly emphasizing the height adjustment mechanism in an adjusted position.

FIGS. 20-22 illustrate front perspective views of the adjustment mechanisms 20, and specifically emphasizes the operation of the adjustment mechanisms 20. Each adjustment mechanism 20 cooperates with the bracket 16 to adjust the display cover 30 in relation to the bracket 16.

FIG. 20 depicts the adjustment mechanisms 20 in a locked state at a first position. In the first position, per adjustment mechanism 20, an adjustment pin 50 is biased by the biasing member 44 into a corresponding geometry on an adjustment rod 48. The adjustment rod 48 may be either integrally connected to the bracket 16 or detachably coupled to the bracket 16. The cooperation between the adjustment pin 50 and the adjustment rod 48 restricts movement of the adjustment mechanism 20 locking it into the first position. This in turn retains the display system 10 into a first position.

As depicted in FIG. 19, when the locking lever 37 of the fastening member 36 is in an upright position, the fastening member 36 is unengaged and enables the adjustment mechanism 20 to be engaged and the translation of the display 10. A first force 52 is applied to the lever 38. The lever engages and compresses the biasing member 44 against the dividing wall 46 translating the adjustment pin 50 out of the corresponding geometry of the adjustment rod 48. This disengages the adjustment pin 50 from the adjustment rod 48 and transitions the adjustment mechanism 20 into an unlocked state in the first position.

FIG. 21 illustrates the adjustment mechanism in an unlocked state at the first position. A second force 54 as shown in FIG. 22, may then be applied to the display cover 30 to move each adjustment mechanism 20 to a second desired position. When the first force 52 on the lever 38 is disengaged, the biasing member 44 is released to allow the adjustment pin 50 to reengage the adjustment rod 48. FIG. 22 illustrates the adjustment mechanism 20 in a locked state at the second position after a downward translation of the display 10. In this figure, the first force 52 on each lever 38 has been removed and the respective adjustment pins 50 are biased into the corresponding geometry on the adjustment rod 48. The adjustment mechanisms 20 and display system 10 are now retained at the second position.

Figures 23A, 23B:
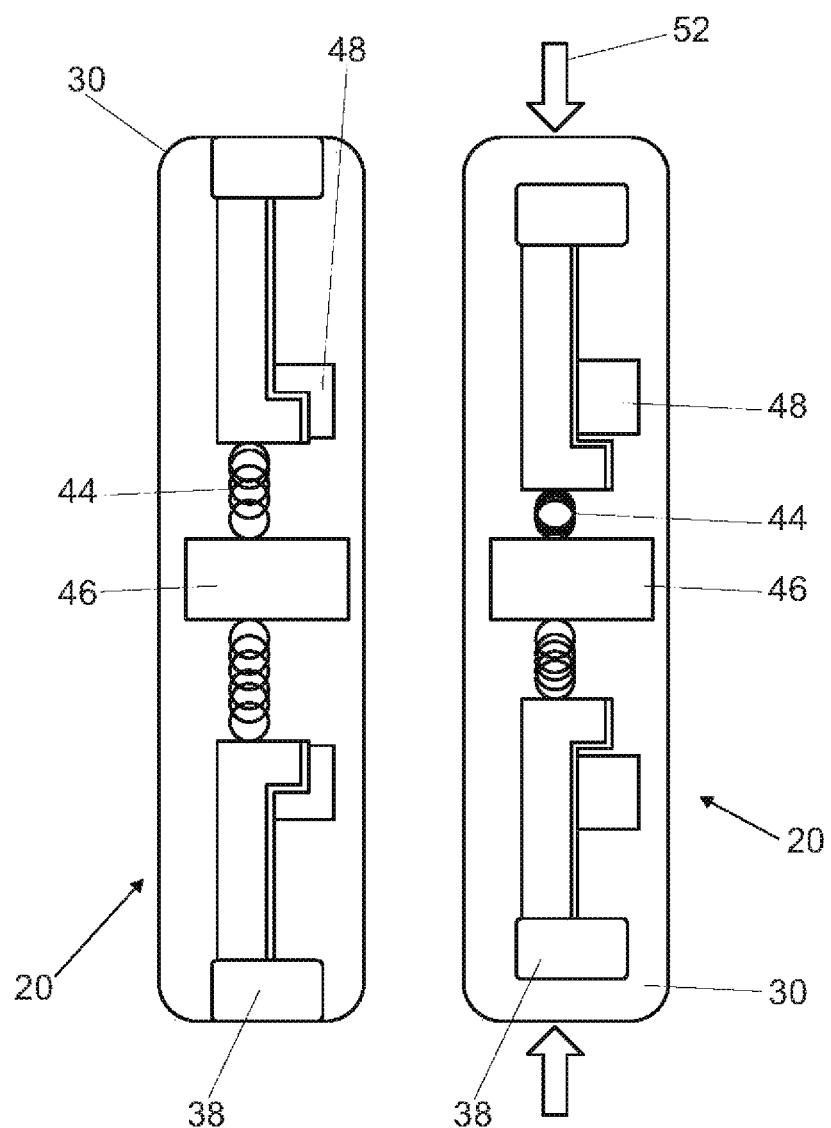
FIG. 23a depicts a top perspective view of the vehicle display height adjustment assembly emphasizing the height adjustment mechanism in a relaxed position.
FIG. 23b depicts a top perspective view of the vehicle display height adjustment assembly emphasizing the height adjustment mechanism in an engaged position.

FIGS. 23*a* and 23*b* illustrate a top perspective view of the adjustment mechanism 20, and specifically emphasizes the operation of the adjustment mechanisms 20. FIG. 23*a* depicts the adjustment mechanisms 20 in a locked state, and FIG. 23*b* depicts the adjustment mechanisms 20 in an unlocked state. As shown, the biasing members 44 cooperate with the levers 38 and the dividing wall 46. When a first force 52 is applied to the levers 38 the biasing members 44 are compressed against the dividing wall 46. As previously described, this then enables the adjustment mechanisms 20 and display 10 to be translated to a desired height position. In the following an exemplary display height adjustment is described:

The display system 10 may be adjustable in height with a two hand adjustment. I.e. the driver may hold the display screen 11 encased within the bezel 12 in his hands, when a height adjustment is conducted. In a first step, the fixation via the eccentric fastening members 36 needs to be loosen by rotating the locking members 37. Then the driver may push the button-like levers 38 on the left and on the right sides. This pushes the adjustment pins 50 out of their positions within recesses provided by the respective adjustment rods 48 and the display screen 11 may be moved vertically. During said movement, the bracket 16 is guided between a dovetail geometry provided by the bracket support members 22. When an end-position is roughly found, the driver stops pushing the button-like levers 38, moves the display screen 11 slightly upwards or downwards until the adjustment pins 50 enter complementary recesses provided by the respective adjustment rods 48. As a last step, the fastening members 36 need to be tighten via the locking members 37. During the tightening, the driver no longer has to hold the display screen 11 encased within the bezel 12.

Figure 24:
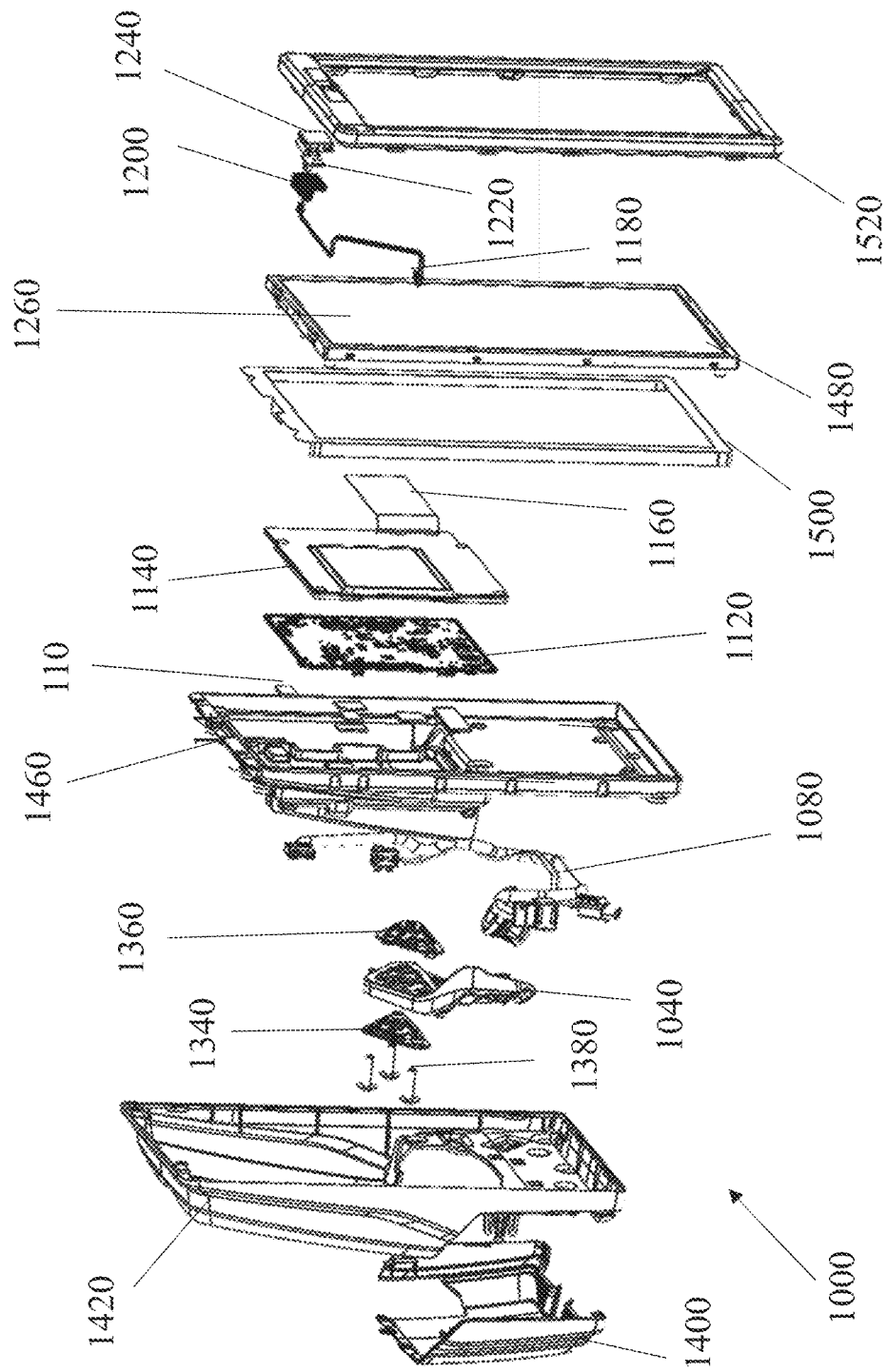
FIG. 24 illustrates an exploded view of a display unit for a vehicle according to the present disclosure.

FIG. 24 illustrates an exploded view of a display unit 1000. A display cover 1400 is operably coupled with a display housing 1420. In this form, the display cover 1400 is secured by a snap fit connection on a bottom side of the display housing 1420. The display cover 1400 may also be secured by other known fastening means. The display housing 1420 in cooperation with the display cover 1400 provides sealed cover for interior display components and protects interior components of the display unit 1000. The display cover 1400 may be designed to have two geometric configuration, one for a right hand driving vehicle and one for a left hand driving vehicle.

An display adaptor 1040 acting as an attachment means, engages with a first insulating means 1340 and a second insulating means 1360. The first and second insulating means 1340, 1360 are made from an electrically isolating material. In this form, the first and second insulating means 1340, 1360 have a triangular geometry which is configured to engage with the corresponding triangular portion of the display adaptor 1040 on opposing sides. The first and second insulating means 1340, 1360 are designed to provide electrical isolation between the display adaptor 1040 and the at least one fastener 1380. The second insulating means 1360 electrically isolates the display adaptor 1040 from a display frame 1460 when assembled. A non-conducting sleeve (not shown) may be further included in the display adaptor 1040 or the first and second insulating means 1340, 1360 to further electrically isolate the at least one fastener 1380 from the display adaptor 1040 when the display adaptor 1040 is assembled to the display frame 1460. In this form, three fasteners 1380 are used to attach the first insulating means 1340, the display adaptor 1040 and the second insulating means 1360 to the display frame 1460. The at least one fastener 1380 is a screw but may be any known fastener. It is within the scope of this disclosure that the first and second insulating means 1340, 1360 maybe be located in any location and have a different geometry or orientation to provide for electrical isolation for the display adaptor 1040. In another form, the first and second insulating means 1340, 1360 may provide for galvanic decoupling of the display adaptor 1040 from the display frame 1460 and the at least one fastener 1380.

A first wire harness 1080 is connected at a first end to a vehicle wiring harness 2140 (FIG. 26*b*) and at a second end to the display frame 1460 to provide a power supply, Controller Area Network (CAN) communication and micro switch signals to the display unit 1000. The first wire harness 1080 also contains a ground connected to an electronic control unit (ECU) 1120 and a shielding element 1140. The first and second insulating means 1340, 1360 electrically isolate the display adaptor 1040 from the ground and power supply provided to the display frame 1460 by the first wire harness 108. A grommet (not shown) is used to seal the wiring harness at a display frame opening (not shown) providing a containment seal for the display frame 1460.

Figure 26A:
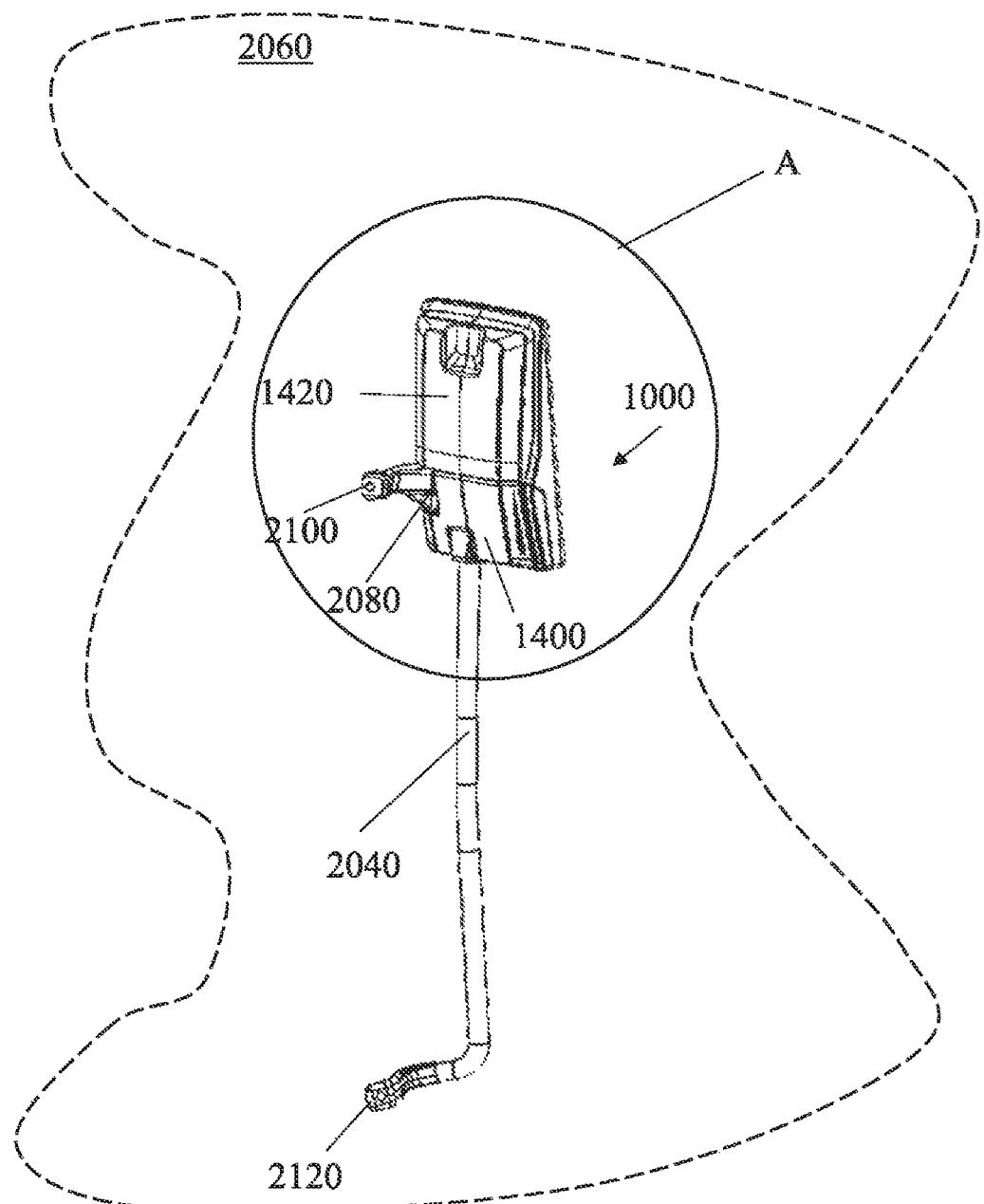
FIG. 26a illustrates a rear view of the display unit for the vehicle according to the present disclosure.

The display adaptor 1040 is configured to act as a reference point system (RPS) for mounting the display unit 100 to the vehicle surface 2060 (FIG. 26*a*). The display adaptor 104 illustrated in FIG. 24 has a LH driving geometry but the display adaptor 1040 also has a second part configuration which could be used for a RH driving geometry. The first variation is for a left hand (LH) driving configuration and a second variation is for mounting to a right hand (RH) driving configuration. The display cover 1400 and the first wiring harness 108 also have separate configurations for mounting in a RH or LH mounting location. In this form, a separate right hand (RH) and left hand (LH) driving configuration for the display cover 1400, the first wiring harness 108 and the display adaptor 104 creates less complexity for the display unit 1000. The display housing 1420 has features to accommodate both the left hand (LH) and the right hand (RH) driving configurations allowing the display housing to be used for either driving assembly configuration. In this form, mounting a LH or RH driving configuration can be accommodated by selecting a LH or RH version for the display adaptor 1040, the first wiring harness 1080 and the display cover 140. All other components shown in FIG. 1 for the display unit 1000 have a single part configuration for use in both the LH or the RH driving configurations.

In FIG. 24, the display unit 1000 includes a display frame 1460 configured to couple to an inside surface of at least one heat sink 1100. The at least one heat sink 1100 is designed to attach to an electronic control unit (ECU) 1120 and dissipate heat generated by the ECU 1120 and other components of the display unit 1000. The moderation of temperature improves the performance and longevity of the electrical components and the display unit 1000. In this form there are six individual heat sinks 1100 mounted for cooling of the ECU 1120 shown in the exploded view of FIG. 24. Each heat sink 1100 may have a unique size or configuration from other heat sinks 1100 in the display unit. The at least one heat sink 1100 mounts between the ECU 1120 and the display frame 1460. The display frame 1460 includes mechanically engaging fastener which retains the at least one heat sink 1100, the ECU 1120, and the shielding element 1140. In this form, the mechanically engaging fastener is a screw with a snap fit feature. However, it is within the scope of this disclosure for any fastener known in the art to be used to secure these elements to the display frame 1460.

A shielding element 1140 is configured to cover the display side of the ECU 1120. The shielding element 1140 is an electromagnetic shield (EMC) to guard against incoming or outgoing electromagnetic radiation emissions which may impact the performance of the display unit 1000. The shielding element 1140 may also provide additional sealing to reduce external contaminants such as dust particles from reaching the ECU 1120. A second wiring harness 1160 electrically connects to the ECU 1120. In this form, the second wiring harness 1160 is a flat wiring harness and conforms to the configuration of the shielding element 1140. The display frame 1460 may also incorporate electromagnetic shielding capabilities.

The display 1480 is generally planar, with the outer edge defining a display front surface 1260. The display front surface 1260 can be shaped to correspond to and fit within the shape of the viewing area of the display unit 1000. An adhesive 1500 may be used between the display 1480 and a display bezel 1520 or between the display 1480 and the display frame 1460. Any adhesive suitable for adhering the display bezel 1520 to the display 1480 may be used. In this form, the adhesive 1500 is an adhesive tape. The adhesive 1500 provides a seal which will protect the display unit 1000 from ingress of containments such as water and dust.

With reference to FIG. 24, a light sensor 1220, a light sensor cover 1200, a light guide 124, and a third wiring harness 118 form a light sensor assembly. The light sensor 1220 is located to receive ambient light and in this form the light sensor 1220 is a PCBA light sensor. Other light sensors may also be used. The light sensor cover 1200 in this form is constructed from a flexible thermoplastic elastomer (TPE). The light sensor 1220 is a snap-fit connection into the light guide 1240 where the light guide 1240 is designed to direct ambient light to the light sensor. One example of light detection by the light sensor 1220 is receiving an input light from a headlamp of a trailing vehicle. The input light received is used to determine a likely glare visible on the display front surface 1260. The likely glare may be calculated by algorithm in the ECU 1120 based on the input light received or it may be determined by a look-up table. The glare value is used to adjust settings for the display 1480 optimizing viewing of the display front surface 1260. The light sensor 1220 could also be an imager on a rear portion of the vehicle, wherein a signal representative of the received light is communicated from the light sensor 1220 to the display unit 1000. The light sensor assembly in this form is attached to the display bezel 1520 and indirectly coupled to the display frame 1420. In other variations the light sensor assembly may be attached to other component in the display 1000 or directly coupled to the display frame.

Figure 25:
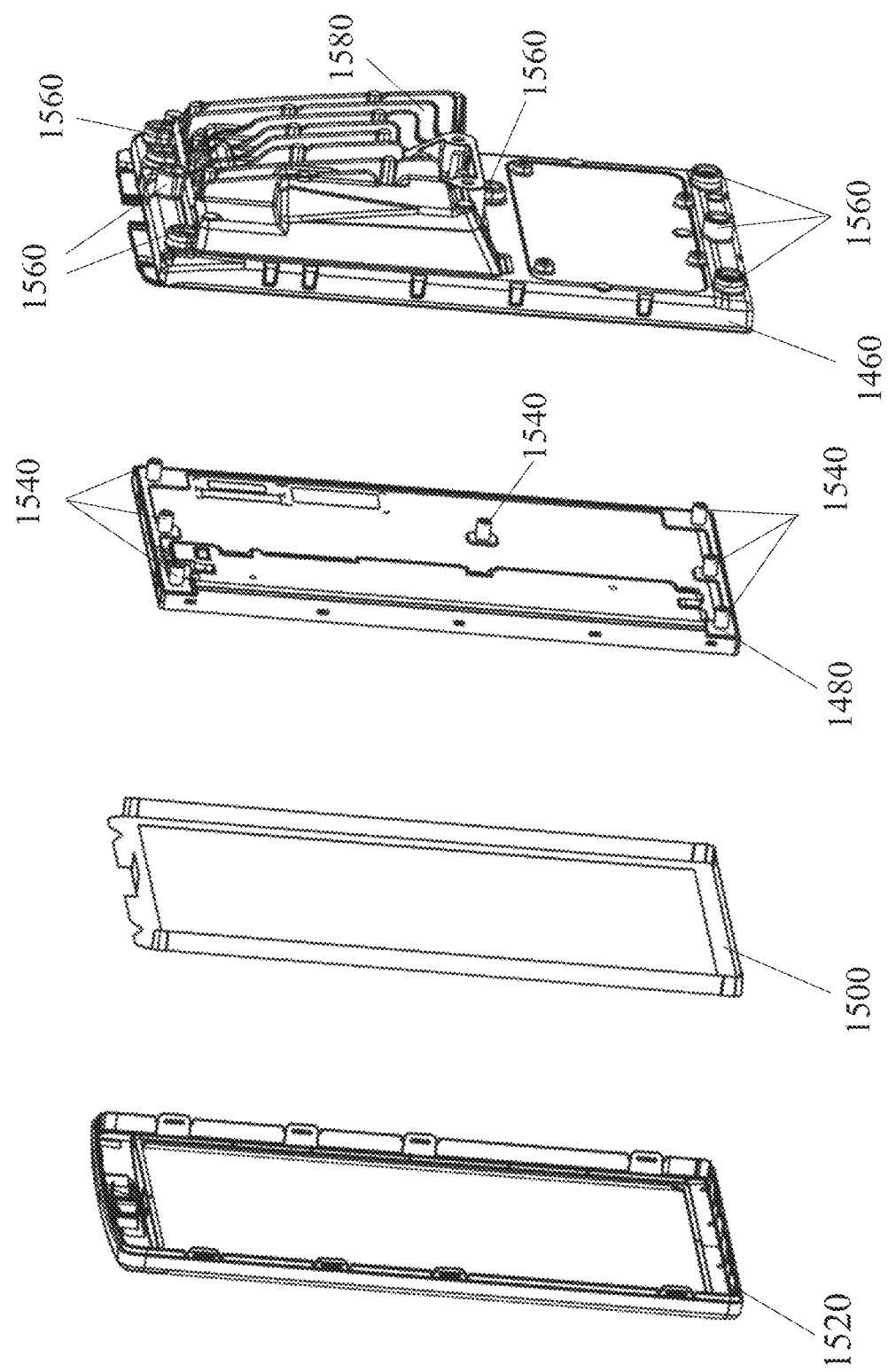
FIG. 25 illustrates an exploded view of the display attachment arrangement according to the present disclosure.

FIG. 25 illustrates the attachment configuration for the display frame 1460, the display 1480, the adhesive 1500 and the display bezel 1520. The display frame 1460 has at least two apertures 1560 for attaching the at least two mounting elements 1540 of the display 1480. At least one of the at least two apertures 1560 and the at least two mounting elements 1540 are located in the interior area of the display frame 1460 and display 1480. Fasteners (not shown) are inserted through the at least two apertures 1560 into the at least two mounting elements 1540. In this form there are seven fasteners such as a screw with seven corresponding mounting elements 1540 and apertures 1560 used for attaching the display 1480 to the display frame 1460. Six of the fasteners with corresponding mounting elements 1540 and apertures 1560 are located at the perimeter of the display frame 1460 and the display 1480. The seventh fastener with corresponding mounting element 1540 and aperture 1560 is located in the interior area of the display frame 146 and the display housing 1420 approximately in the center shown in FIG. 25. The fastener in this form is a screw but the fastener maybe any known fastener in the art to secure the display frame 1460 to the display 1480. Locating at least one of the at least two apertures 1560 and at least one of the at least two mounting elements 1540 in the interior of the display frame 1460 and the display 1480 provides for additional stiffness and stabilization reducing the stress and forces acting on the display 1480 during excessive loading that may occur for example in a crash event. The additional stiffness and stabilization of the display frame 1460 inhibits fracturing of the display front surface 1260 reducing the possibility of debris.

In FIG. 25, the display frame 1460 has at least one cooling fin 1580. The at least one cooling fin 158 increases the surface area of the display frame 1460 and thus provide for greater heat transfer and cooling for the display unit 1000. In this form, there are six cooling fins with a corresponding geometry to be inserted into the display housing 1420 but there may be more or less cooling fins depending on the cooling required. The geometry of the at least one cooling fin 1580 may also be varied to accommodate insertion into a display housing 1420 and provide cooling for the display unit 1000. The at least one cooling fin 1580 may also provide structural reinforcement to the display frame 1460. The display frame 1460 in this form is made of an aluminum or aluminum alloy but the material used for the display frame may be any material capable of providing thermal transfer and structural support such as other metal, metal alloys or metal reinforced plastics.

FIG. 26*a* illustrates the display unit 1000 with display housing 1420 and display cover 1400 attached on a vehicle surface 2060. The display unit 1000 utilizes attachment to an intermediate adapter 2080 to couple to a grab bar 2040. The intermediate adapter 2080 provides a first mounting member 2100 for mounting to the vehicle surface 2060. The grab bar 2040 is generally cylindrical and provides a second mounting member 2120 for attachment to the vehicle surface 2060. The vehicle surface 2060 may be in any vehicle mounting location within the scope of this disclosure. In this form, the vehicle surface 2060 is an interior mounting surface on a vehicle A-pillar. An area A is defined in FIG. 26*a* to illustrate the area shown in an enlarged view in FIG. 26*b*.

Figure 26B:
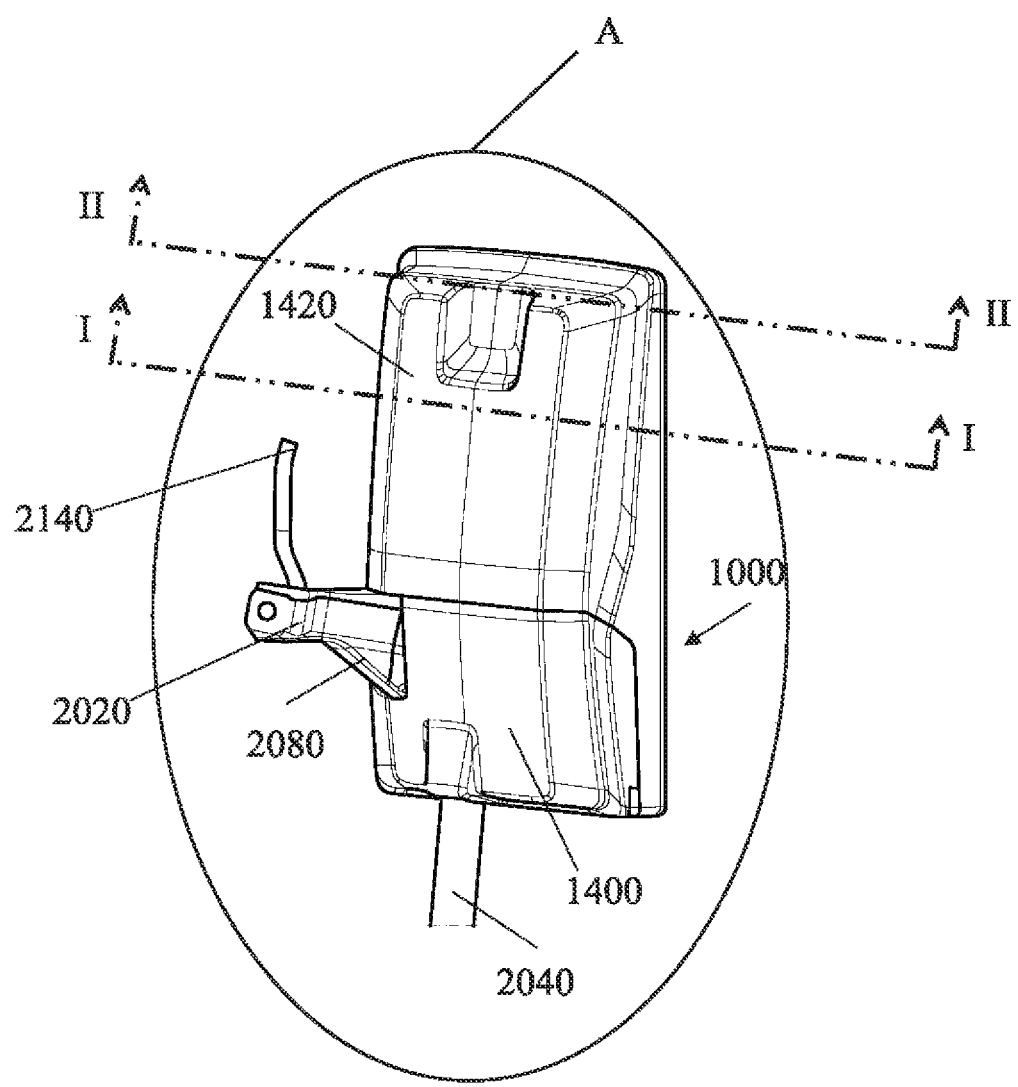
FIG. 26b illustrates an enlarged rear view of an Area A from FIG. 26a according to the present disclosure.

FIG. 26*b* illustrates an enlarged rear view of an area A from FIG. 26*a*. A retention strap 2020 is used in cooperation with the intermediate adapter 20800 for mounting the display unit 1000 to the vehicle surface 2060. The retention strap 2020 is made of steel and is design to restrain the display unit 1000 if a force exceeding design parameters is applied to the intermediate adapter 2080 such as in a crash situation. The retention strap 2020 in this form mounts between the intermediate adapter 2080 and the vehicle surface 2060. A vehicle wiring harness 2140 is shown which may connect with any of the first, second or third wiring harnesses (1080, 1160, 1180). The vehicle wiring harness 2140 may provide electrical power and data transfer to the display unit 1000. A section line I-I is shown in FIG. 26*b* for a sectional view illustrated in FIGS. 29-31. A section line II-II is defined for a section view illustrated in FIGS. 26*a* and 26*b*.

Figure 27:
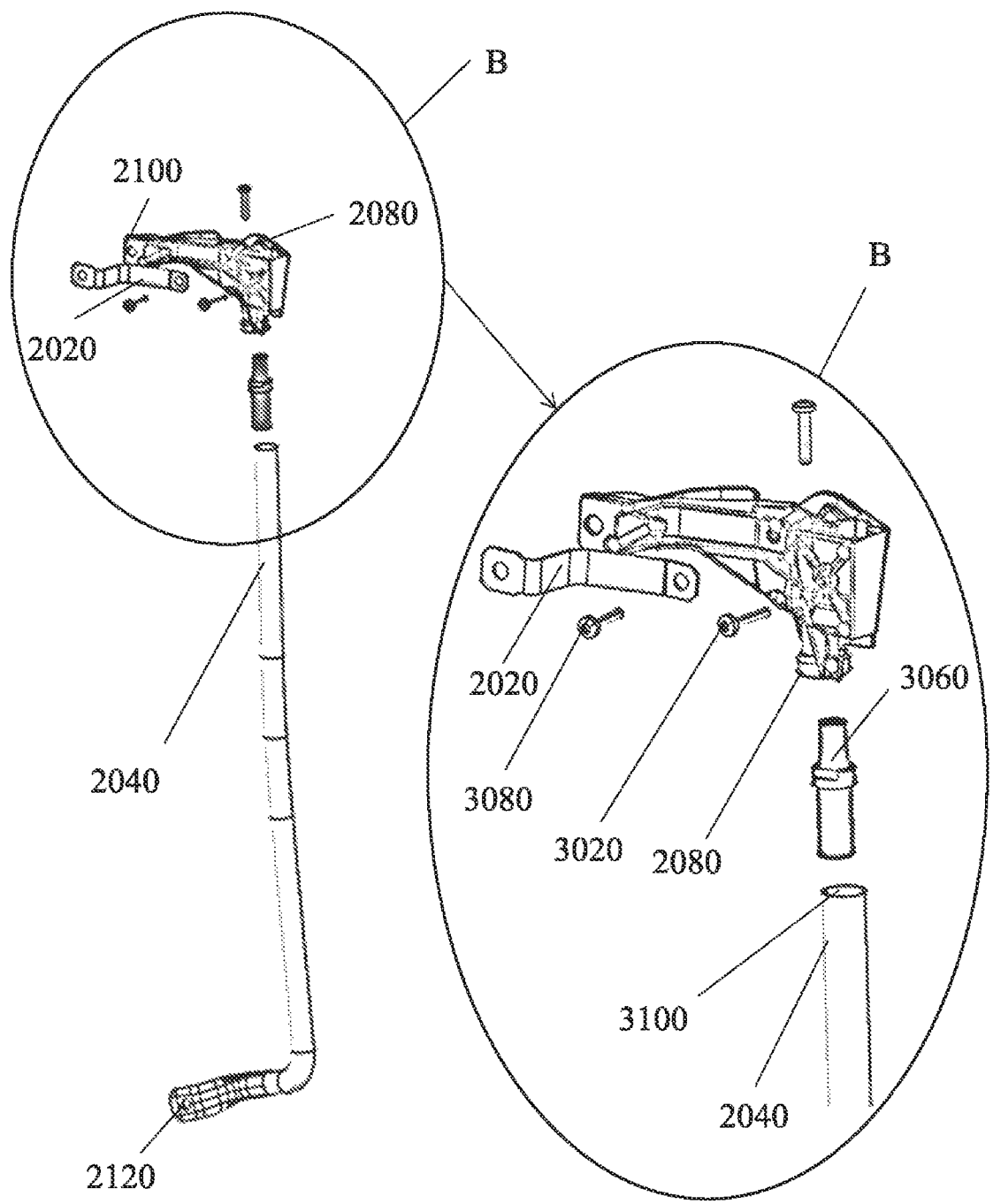
FIG. 27 illustrates an exploded view and an enlarged view of an Area B of an intermediate adapter configuration according to the present disclosure.

FIG. 27 illustrate the intermediate adapter 2080 and the retention strap 2020. An enlarged area B is shown to illustrate details of the intermediate adapter 2080. The retention strap 2020 is shown attached to the intermediate adapter with a fastener 308. In this form, a fastener 3020 couples the display adaptor 1040 (FIG. 24) to the intermediate adapter 2080. The cooperation of the display adaptor 1040 to the intermediate adapter 2080 provides mounting for the display unit 1000 to the vehicle surface 2060 (FIG. 26a). A connection member 3060 in this form is a steel material and is generally coextensive with the inner perimeter of the aperture 3100 of the grab bar 2040 at a distal end. The connection member cooperates with the intermediate adapter 2080 at a proximal end and at the distal end to the grab bar 2040 through aperture 3100, coupling the intermediate adapter 2080 to the grab bar 2040.

Figure 28:
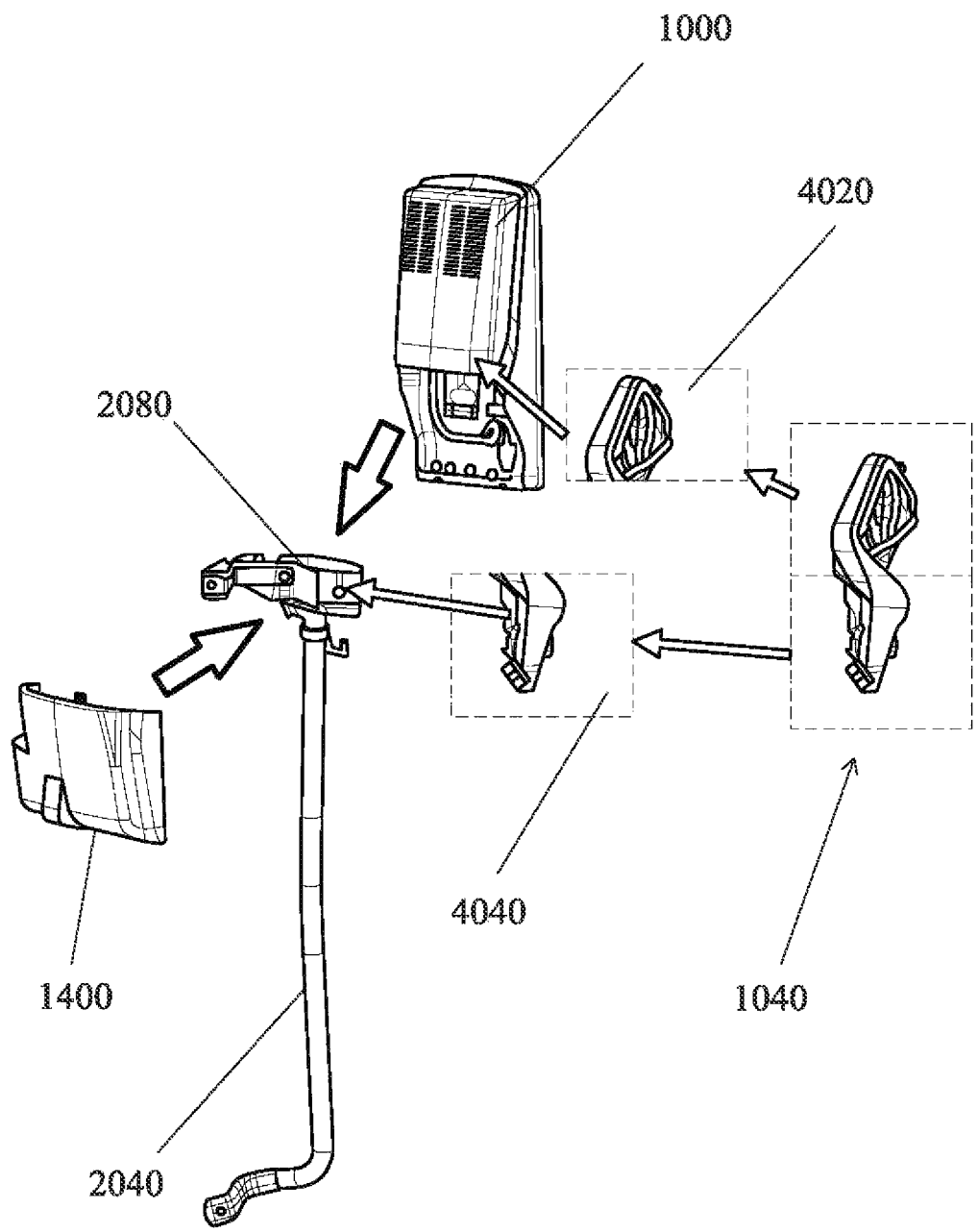
FIG. 28 illustrates an exploded view of a mounting arrangement for the display unit according to the present disclosure.

FIG. 28 illustrates an exploded view of the mounting arrangement for the display unit 1000 utilizing the display adaptor 1040. Display adaptor 1040 is illustrated in an upper section 4020 and a lower section 4040. The lower section 4040 of the display adaptor 1040 is attached to the intermediate adapter 2080 as described above in FIG. 27. The upper section 4020 of the display adaptor 1040 is configured to be attached with the first and second insulating means 1340, 1360 to the display frame 1460 as illustrated in FIG. 24. In this form, the upper section 4020 is attached to the display frame 1460 with at least one fastener 1380. The lower section 4040 of the display adaptor 1040 is coupled to the intermediate adapter 2080 through fastener 3020 (FIG. 27). The display adaptor 1040 provides coupling of the display unit 1000 to the intermediate adapter 2080. The intermediate adapter provides for mounting for the display unit 1000 to the vehicle surface 2060. FIG. 28 illustrates the LH configuration of the display adaptor 1040. The right hand configuration of the display adaptor 1040 also has an upper section and a lower section for mounting to the display frame 1460 and the intermediate adapter 2080. Once the display unit 1000 has been attached to the intermediate adapter 2080, the display cover 1400 is attached sealing the display unit and providing an external aesthetic appearance for the display unit 1000. In this form, the display cover 1400 is constructed from a polymer such as a plastic.

Figure 29:
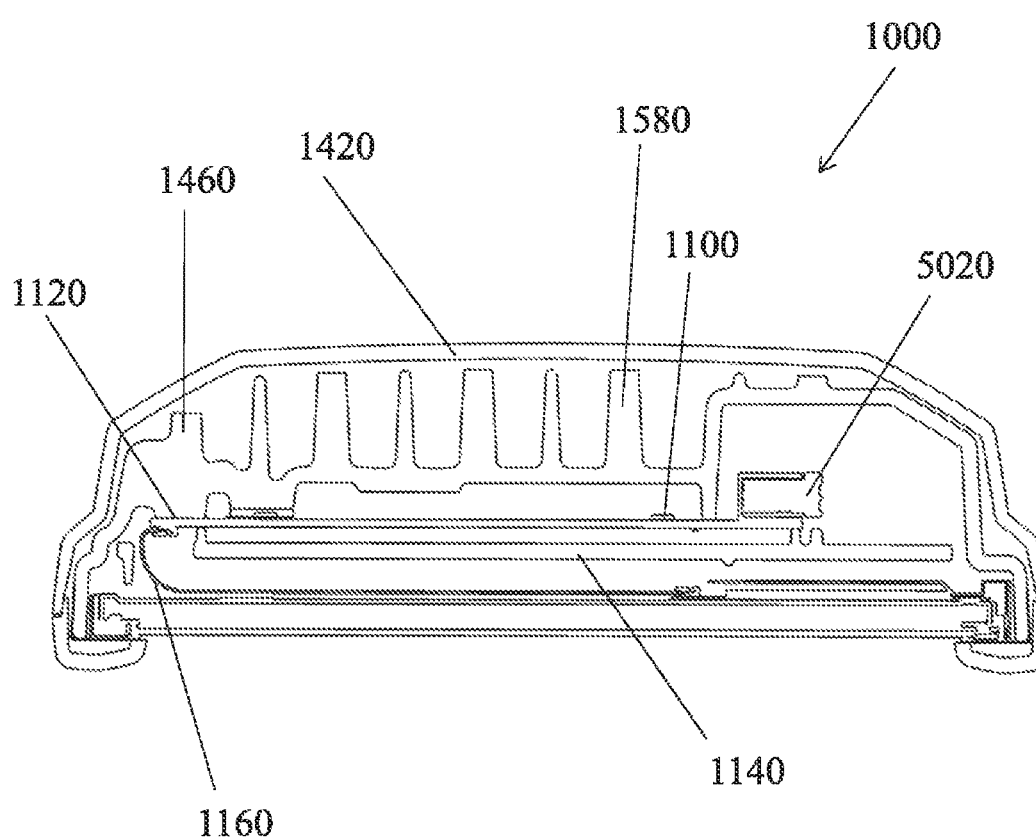
FIG. 29 illustrates a sectional view of the display unit from section I-I in FIG. 26b according to the present disclosure.

FIG. 29 illustrates a sectional view I-I of the display unit 1000 defined in FIG. 26b. The display housing 1420, display frame 1460, the at least one heat sink 1100, the ECU 1120, the shielding element 1140 and the second wiring harness 1160 are shown. The at least one cooling fin 1580 is illustrated in relation to the ECU 1120. The ECU 1120 is connected to the second wiring harness 1160 and in this form is generally planar as shown in FIG. 24. The at least one heat sink 1100 is placed adjacent to the ECU to provide cooling for electrical components mounted on the ECU 1120. A connector 5020 is an electrical connector for attaching the first wiring harness 108. The shielding element 1140 is placed adjacent to the ECU 1120 and provides EMC shielding of incoming and outgoing electromagnetic radiation emissions. The shielding element 1140 in this form is configured to complement the geometry of the ECU 1120 as shown in FIG. 24. The second wiring harness 1160 in this form is routed through an opening in the shielding element 1140.

Figure 30:
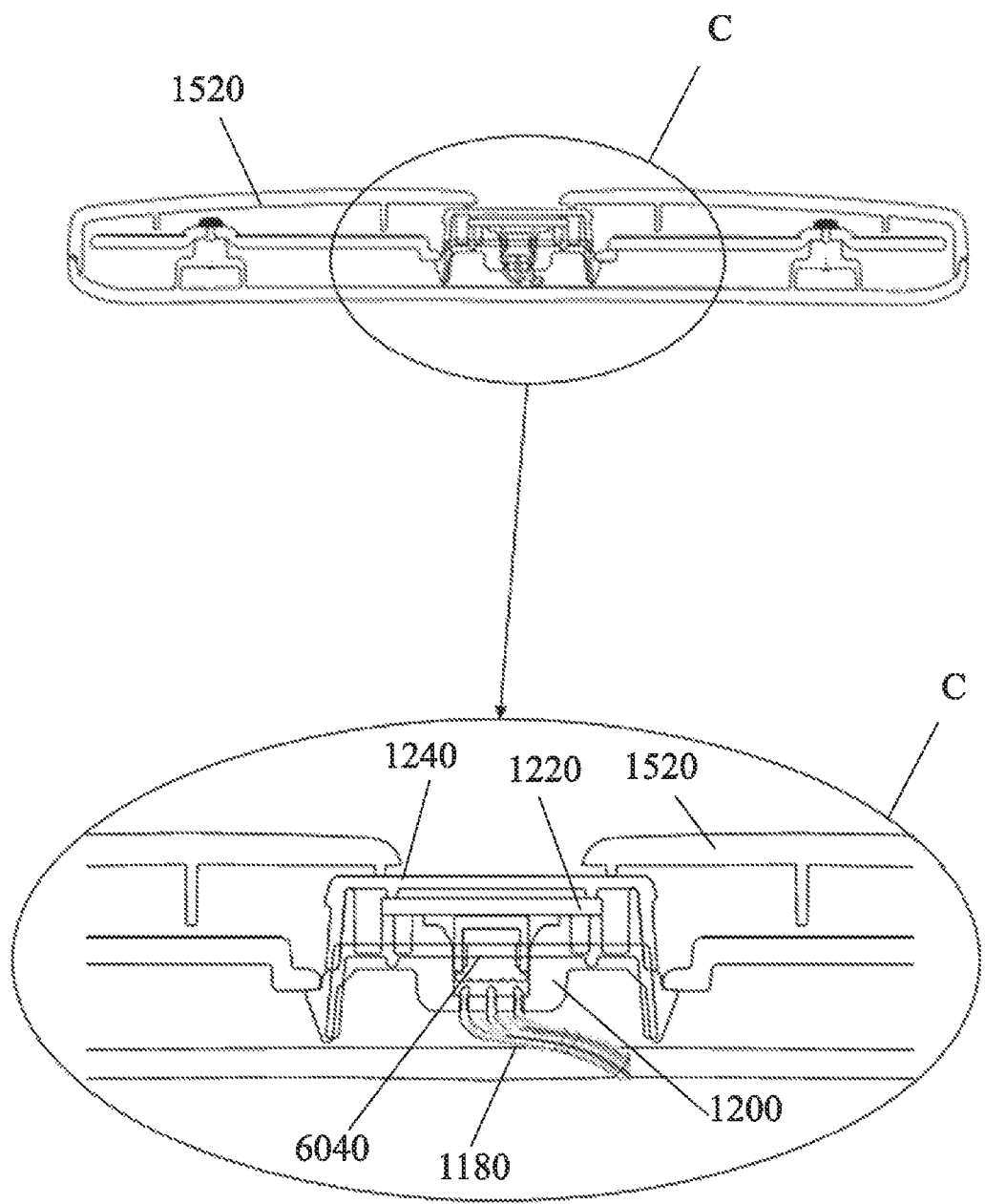
FIG. 30 illustrates a sectional view in whole and an enlarged view of an Area C of a light sensor assembly for the display unit for a vehicle according to the present disclosure.

FIG. 30 illustrates the sectional view of II-II of the display unit 1000 defined in FIG. 26b. An enlarged area C is provided for more details. The light guide 1240, the light sensor 1220, the third wiring harness 1180, the light sensor cover 1200 and an electrical connector 6040 are included in a light sensor assembly. The light sensor 1220 attaches to the light sensor cover 1200 and is arranged in the light sensor assembly to be visible from outside the display bezel 1520. A cutout in the display bezel 1520 allows for light to enter the light guide 1240. However, this cutout also allows the light sensor 1220 to be visible from the exterior. The visibility of the light sensor from the exterior of the display bezel 1520 can affect the aesthetics of the display unit 1000. The light guide 1240 in this form is a smoked glass which conceals the light sensor 1220 from an exterior view and provides a more aesthetically pleasing appearance of the display unit 100. The use of smoked glass for the light guide 1240 reduces the amount of ambient light which reaches the light sensor 1220. To offset the reduction in ambient light reaching the light sensor 1220, the ECU 1120 is calibrated to recognize and utilize the reduced light sensor input for the display functions such as reduction of glare on the display. The light sensor cover 1200 is a flexible material such as TPE.

Figure 31:
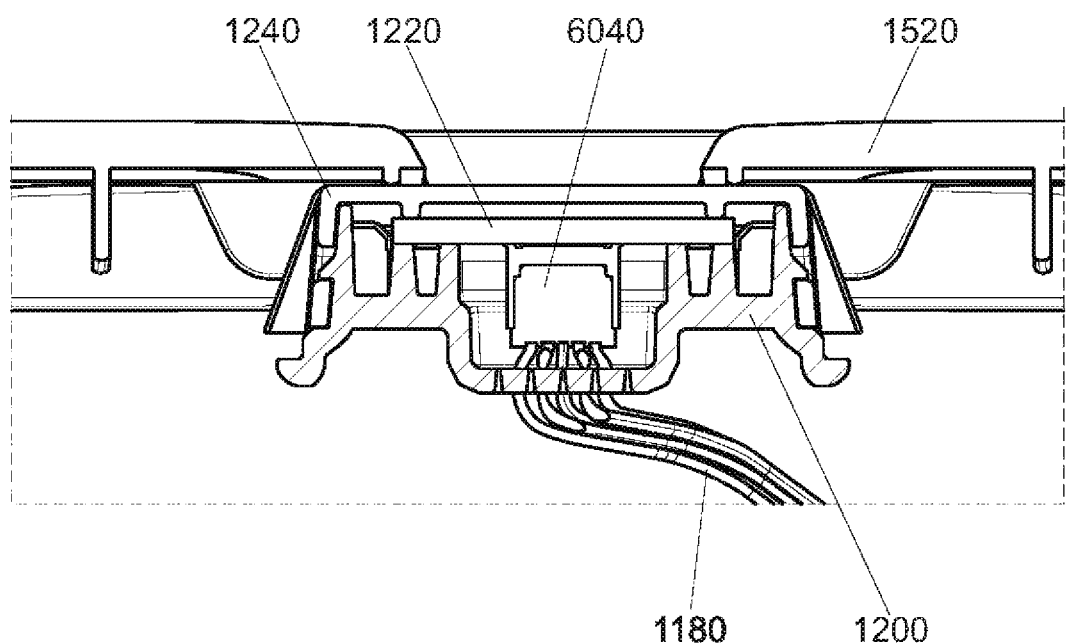
FIG. 31 illustrates second graphical representation of the sectional view of the light sensor assembly for the display unit according to the present disclosure.

FIG. 31 illustrates a second graphical representation of the sectional view of the light sensor assembly seen in FIG. 30 for the display unit 1000.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. The features of the invention disclosed in the foregoing description, in the drawings and in the claims can be essential both individually and in any combination for the implementation of the invention in its various embodiments.

REFERENCE SIGN LIST

1—Vehicle
10—display System
11—Display Screen
12—Bezel
13—Inner Bracket Cover
14—Outer Bracket Cover
16—Bracket
18—Adjustment Mechanism Fasteners
20—Adjustment Mechanism
22—Bracket Support Member
24—Bracket Support Fasteners
26—First Gasket
28—Tolerance Biasing Element
30—Display Cover
32—Second Gasket
34—Display Adapter
36—Fastening Member
37—Locking Lever
38—Lever
40—First bracket element
42—Second bracket element
44—Biasing Member
45—Side Wall
46—Dividing Wall
47—Receiving Cavity
48—Adjustment rod
50—Adjustment Pin
52—First Force
54—Second Force
A—First Direction
B—Second Direction
100—display retention system 101—A-Pillar
102—Display Unit
104—Grab Bar
106—First Mounting Member
108—Second Mounting Member
110—Display Frame
111—Rib Member
112—Intermediate Adapter
113—Mounting Arm
114—Attachment Component
115—Proximal End
116—First Insulating Element
116'—Second Insulating Element
117—Distal End
118—Display Fastener
120—Retention Strap
122—Fracture Point
124—Retention Member Connection Point
126—Retention Strap/Retention Member Fastener
128—Attachment Component Fastener
200—Vehicle display retention system
201—A-Pillar
202—Display Unit
204—Grab Bar
206—First Mounting Member
208—Second Mounting Member
210—Display Frame
212—Intermediate Adapter
213—Mounting Arm
214—Attachment Component
215—Proximal End
217—Distal End
218—Display Fastener
220—Retention Strap
222—Fracture Point
224—Retention Member Connection Point
225—Mounting Fastener
226—Retention Member Fastener
228—Guiding Slot
230—Guiding Aperture
232—Stopping Surface
234—Securing Element
236—Biasing Element
238—First Fastening Element
240—Second Fastening Element
1000—Display Unit
1040—Display adaptor
1080—First Wiring Harness
1100—Heat Sink
1120—Electronic Control Unit—ECU
1140—Shielding Element
1160—Second Wiring Harness
1180—Third Wiring Harness
1200—Light Sensor Cover
1220—Light Sensor
1240—Light Guide
1260—Display Front Surface
1340—First Insulating means
1360—Second Insulating means
1380—Fastener
1400—Display Cover
1420—Display Housing
1460—Display Frame
1480—Display
1500—Adhesive
1520—Display Bezel
1540—Mounting Element
1560—Aperture
1580—Cooling fin
2020—Retention Strap
2040—Grab Bar
2060—Vehicle surface
2080—Intermediate Adapter
2100—First mounting member
2120—Second mounting member
2140—Vehicle wiring harness
3020—Fastener
3060—Connection Member
3080—Fastener
3100—Aperture
4020—Upper Section
4040—Lower Section
5020—Connector
6040—Electrical Connector

The invention claimed is:

1. A vehicle display retention system, comprising:
a display unit affixed to a display frame and connected to a grab bar;
an intermediate adapter coupled to the grab bar, the intermediate adapter comprising a mounting arm for attachment to a vehicle at a first mounting member;
a retention strap coupled to the mounting arm and the vehicle at the first mounting member with a mounting fastener, wherein the retention strap is configured to retain the vehicle display retention system if a fracture point of the mounting arm fails; and
an attachment component coupled to the intermediate adapter.

2. The vehicle display retention system of claim 1, wherein the grab bar is coupled to the vehicle at a second mounting member.

3. The vehicle display retention system of claim 2, wherein the fracture point of the mounting arm is located between the first mounting member and a retention member connection point.

4. The vehicle display retention system of claim 1, further comprising an insulating element coupled to the attachment component to inhibit electrical interference and/or thermal conductance from the attachment component to the display frame.

5. The vehicle retention display of claim 1, wherein the display frame is coupled to the attachment component via at least one display fastener.

6. The vehicle display retention system of claim 1, wherein the attachment component includes a securing element and the intermediate adapter includes a stopping surface, wherein the securing element and the stopping surface cooperate when engaged to retain the display frame.

7. The vehicle display retention system of claim 6, wherein the attachment component includes a guiding aperture which is configured to receive a guiding element and aligns with a guiding slot in the display frame and wherein the guiding element cooperates with the guiding slot and the guiding aperture to align the attachment during assembly.

8. The vehicle display retention system of claim 1, further comprising a biasing element coupled to the attachment component at a first end and the display frame at a second end.

9. A vehicle display retention system, comprising:
a display unit comprising a display frame;
an attachment component coupled to the display frame;

an intermediate adapter coupled to the attachment component, wherein the intermediate adapter comprises a mounting arm for attachment to a vehicle at a first mounting member;

a retention strap, wherein the retention strap is attached to the mounting arm at the first mounting member, the retention strap further attached with a retention member fastener to a retention member connection point located on the intermediate adapter, wherein the retention strap is configured to retain the vehicle display retention system if a fracture point at the mounting arm fails; and a grab bar connected to the intermediate adapter, wherein the grab bar includes a second mounting member for attaching to a vehicle.

10. The vehicle display retention system of claim 9, wherein the attachment component further comprises at least one insulating element.

11. The vehicle display retention system of claim 9, wherein the intermediate adapter is configured to have a fracture point located between the first mounting member and the retention member connection point.

12. The vehicle display retention system of claim 9, wherein the retention strap has a width between 5 mm and 30 mm.

13. A vehicle display system, comprising:
a bracket;
at least one bracket support member, wherein the bracket support member comprises a receiving cavity to retain the bracket;
a display cover coupled to the at least one bracket support member;
a display adapter coupled to the display cover; and
at least one adjustment mechanism coupled to the display cover, wherein the adjustment mechanism comprises,
at least one mounting member that couples to the display adapter, wherein the mounting member comprises at least one first bracket element and at least one second bracket element,
a lever that is slidably engaged within the first bracket element, and
a biasing element supported by the second bracket element,
wherein the biasing member cooperates with the lever such that, when a first force is applied to the lever the biasing member is compressed to enable the adjustment mechanism to be translated to a desired position.

14. The vehicle display system of claim 13, further comprising
at least one fastening member for coupling the display adapter to the display cover such that, when the fastening member is loosened, the adjustment mechanism is functional to enable movement of the display cover in relation to the bracket, and, when the fastening member is tightened, the movement of the adjustment mechanism is restricted.

15. The vehicle display system of claim 14, wherein at least one of:
(i) each fastening member comprises a locking lever, with the locking lever being rotatable between an open position loosening the fastening member and a closed position tightening the fastening member, or
(ii) each fastening member comprising an eccentric screw.

16. The vehicle display system of claim 13, further comprising at least one of:
(i) at least one first gasket located between the bracket support member and the display cover, or (ii) at least one second gasket located between the display cover and the display adapter, with each second gasket being designed to fit on one fastening member.

17. The vehicle display system of claim 16, wherein at least one tolerance biasing element is located between the display cover and the first gasket, arranged on either the inside or outside of the bracket support member.

18. The vehicle display system of claim 17, wherein at least one of:
(i) the tolerance biasing element cooperates with a side wall of the bracket support member and the display cover to ensure alignment of the bracket support member, or
(ii) the tolerance biasing element cooperates with the display adapter and the bracket support member to ensure a proper mounted alignment.

19. The vehicle display system of claim 13, wherein the adjustment mechanism further comprises,
an adjustment pin that cooperates with the biasing element, and
an adjustment rod that cooperates with the adjustment pin, with the adjustment rod being integrally connected to the bracket or detachably coupled to the bracket.

20. The vehicle display system of claim 13, further comprising, a dividing wall, wherein at least one of:
(i) the cover has the dividing wall as a physical barrier separating two adjustment mechanisms,
(ii) the biasing members of two adjustment mechanisms cooperate with the respective levers and the dividing wall such that, when a first force is applied to the levers the biasing members are compressed against the dividing wall to enable the adjustment mechanisms and a display screen to be translated to a desired height position, or,
(iii) per adjustment mechanism, the lever engages and compresses the biasing member against the dividing wall for translating the adjustment pin out of the corresponding geometry of the adjustment rod.

21. The vehicle display system of claim 13, wherein there are two or four adjustment mechanisms, with each fastening member cooperating with one adjustment mechanism retaining the location of the display cover in relation to the bracket when the fastening member is in a locked position.

22. The vehicle display system of claim 13, wherein there are at least two bracket support members between which the bracket can be vertically moved for a height adjustment, with the bracket support members providing a dovetail guiding.

23. The vehicle display system of claim 13, wherein at least one of:
(i) there are four bracket support members located in proximity to the four corners of the bracket, or
(ii) there are two first gaskets located between each bracket support member and the display cover, with the first gaskets being injected into the display system during assembly.

24. The vehicle display system of claim 13, further comprising,
at least one display screen coupled with the display adapter,
wherein a bezel encases the display screen.

25. The vehicle display system of any claim 13, further comprising,
an electronic control unit (ECU) attached to the display frame,
a display adaptor attached to the display frame and acting as an attachment component, and at least one wire harness,
wherein the vehicle mounted display unit comprises a display cover and a display housing, wherein the display cover and the at least one wiring harness have two geometric configurations, one for the vehicle mounted display unit to be position left from the driver or passenger and one to be position right from the driver or passenger.

26. The vehicle display system of claim 25, wherein the display cover and the at least one wiring harness have separate configurations for a LH driving and a RH driving vehicle, and the display housing is adapted to accommodate both the LH and RH driving configurations.

27. The vehicle display system of claim 25, wherein the display adaptor has a driver configuration and a passenger configuration.

28. The vehicle display system of claim 25, wherein the vehicle mounted display unit comprises a shielding element, wherein the shielding element is arranged adjacent to the ECU, the display frame includes at least one cooling means, and the display adaptor has first and second insulating means.

\* \* \* \* \*